US011908268B2

(12) United States Patent
Mohrhardt et al.

(10) Patent No.: US 11,908,268 B2
(45) **Date of Patent: *Feb. 20, 2024**

(54) NETWORK ARCHITECTURE FOR GAMING INDUSTRY ACCOUNTING

(71) Applicant: JCM American Corporation, Las Vegas, NV (US)

(72) Inventors: Dominic Mohrhardt, Las Vegas, NV (US); Dave Kubajak, Las Vegas, NV (US); Mike Nguyen, Las Vegas, NV (US)

(73) Assignee: JCM American Corporation, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,177

(22) Filed: Apr. 26, 2021

(65) Prior Publication Data

US 2021/0248868 A1 Aug. 12, 2021

Related U.S. Application Data

(63) Continuation of application No. 17/021,598, filed on Sep. 15, 2020, now Pat. No. 10,991,198, which is a continuation of application No. 16/777,756, filed on Jan. 30, 2020, now Pat. No. 10,825,290, which is a continuation of application No. 16/130,346, filed on Sep. 13, 2018, now Pat. No. 10,891,823.

(51) Int. Cl.
*G07F 17/32* (2006.01)

(52) U.S. Cl.
CPC ...... *G07F 17/3225* (2013.01); *G07F 17/3244* (2013.01); *G07F 17/3218* (2013.01); *G07F 17/3223* (2013.01)

(58) Field of Classification Search
None
See application file for complete search history.

(56) References Cited

U.S. PATENT DOCUMENTS

| | | | | |
|---|---|---|---|---|
| 10,825,290 | B2 * | 11/2020 | Mohrhardt .......... | G07F 17/3244 |
| 10,891,823 | B2 * | 1/2021 | Mohrhardt .......... | G07F 17/3216 |
| 10,991,198 | B2 * | 4/2021 | Mohrhardt .......... | G07F 17/3216 |
| 2014/0087849 | A1 | 3/2014 | Page et al. | |
| 2016/0098899 | A1 * | 4/2016 | Page .................. | G06Q 30/0226 463/25 |
| 2019/0197822 | A1 * | 6/2019 | Shepherd ............ | G06Q 20/108 |

FOREIGN PATENT DOCUMENTS

| | | |
|---|---|---|
| CN | 106934619 A | 7/2017 |

* cited by examiner

*Primary Examiner* — Damon J Pierce
(74) *Attorney, Agent, or Firm* — FisherBroyles, LLP; Rob L. Phillips

(57) ABSTRACT

A peripheral device is installed in a cabinet of an electronic gaming machine and configured to detect and communicate with a personal electronic device of a player of a casino game. The personal electronic device is configured to communicate identity information and/or account information to the peripheral device that, in turn, can be used to enable gameplay on the electronic gaming machine. Other embodiments described herein reference a network architecture facilitating cryptographically-secure and verifiable accounting of all point or real-money transactions in a casino environment.

14 Claims, 21 Drawing Sheets

NETWORK ARCHITECTURE FOR GAMING INDUSTRY ACCOUNTING

CROSS-REFERENCE TO RELATED APPLICATION

This application is a continuation of U.S. Nonprovisional patent application Ser. No. 17/021,598, filed Sep. 15, 2020, which is a continuation of U.S. Nonprovisional patent application Ser. No. 16/777,756, filed Jan. 30, 2020, now U.S. Pat. No. 10,825,290, which is a continuation of U.S. Nonprovisional patent application Ser. No. 16/130,346, filed Sep. 13, 2018, now U.S. Pat. No. 10,891,823, the contents of which are incorporated herein by reference as if fully disclosed herein.

TECHNICAL FIELD

Embodiments described herein relate to computer network architectures and, in particular, to a computer network architecture configured to facilitate recording, tracking, and auditing of cash-equivalent wagers, transactions, and/or promotions in a casino, wagering, gaming, or lottery environment.

BACKGROUND

A gaming industry entity, such as a casino, may be required by a regulatory body to maintain accurate records of cashless transactions (e.g., ticket in/ticket out transactions, player card transactions, and so on) initiated by or through an electronic gaming machine controlled by that entity. Conventionally, such transaction records are communicated directly from an electronic gaming machine using software and/or hardware approved of by the regulatory body to a local or remote server.

However, conventional electronic gaming machines typically process cashless transactions without verifying the identity of the individual authorizing or performing the transaction. For example, an electronic gaming machine may automatically debit a player account associated with a player card when that card is inserted into the electronic gaming machine without verifying the identity of the person who inserted the card.

Furthermore, typically once approved, cashless transaction reporting hardware and/or software associated with an electronic gaming machine cannot be modified to incorporate new or additional features—including security-enhancing features—without undergoing an expensive and time-consuming re-approval process conducted by, or under the authority of, the regulatory body.

SUMMARY

Some embodiments described herein generally reference a peripheral device for an electronic gaming machine in a casino environment. The peripheral device includes a mobile interface device configured to establish a communication channel with a personal electronic device of a player and a dedicated processing unit configured to receive an identifier from the mobile interface device. Thereafter, the dedicated processing unit is configured to send an instruction to a peripheral controller in the electronic gaming machine to authorize transactions between an account associated with the identifier and the electronic gaming machine.

Some embodiments described herein reference a system for identifying player accounts in a casino environment.

These example systems include a personal electronic device and an electronic gaming machine. The electronic gaming machine includes a game machine processing unit, a peripheral controller in communication with the game machine processing unit, and a dedicated processing unit. The dedicated processing unit is configured to receive an identifier from the personal electronic device and, in response, send an instruction to the peripheral controller to credit the game machine processing unit from an account associated with the identifier.

Further embodiments described herein reference a method of recording transactions between a player and an electronic gaming machine in a casino environment, the method including the operations of: receiving, at a server communicably coupled to the electronic gaming machine, a request to record a first transaction between the player and the electronic gaming machine; grouping the first transaction with a second transaction; computing a first mutual hash of the first transaction and the second transaction; and computing a second mutual hash of the first mutual hash and a previously-calculated mutual hash of at least a third transaction and a fourth transaction.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
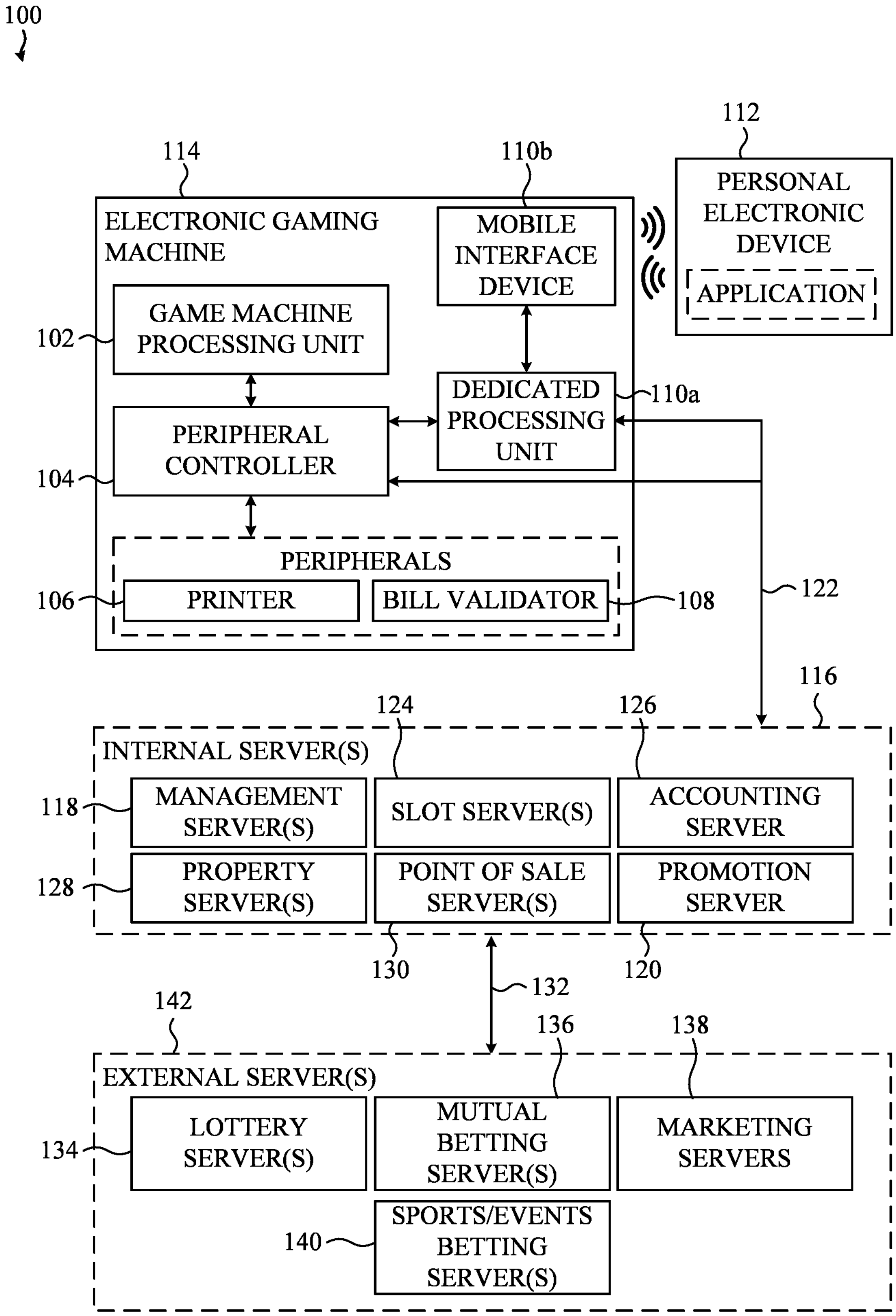
FIG. 1A is a schematic representation of a casino system configured for use in accordance with at least one embodiment such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Some embodiments described herein reference a distributed computer network architecture configured to verify a player's identity and, additionally, to record, track, and/or audit cash-equivalent wagers, transactions, cashouts, redemptions, and/or promotions initiated, processed, or facilitated by an electronic gaming machine (e.g., slot machine, video poker machine, keno machine, and the like) under the control of a gaming industry entity (e.g., a casino or other wagering, gaming, or lottery environment) without requiring modification of—and/or integration with—game machine processing units or existing accounting or computer network systems implemented by a gaming industry entity.

More specifically, embodiments described herein reference a distributed computer network architecture in which a "player" (also referred to as a patron, customer, user, and so on) of an electronic gaming machine in a casino identifies himself or herself to the electronic gaming machine by authorizing communication of identity information from a personal electronic device under the control of the player to a dedicated processing unit (also referred to as a "peripheral device") installed in the same cabinet as, or otherwise proximate to, the electronic gaming machine.

In this manner, a personal electronic device of a player can facilitate secure and authenticated interactions with an electronic gaming machine (e.g., gameplay funded from a player's account) without requiring the player to keep, carry, or present gameplay vouchers (e.g., ticket in/ticket out vouchers, player cards, and so on), cash, or other cashless tokens to the electronic gaming machine. As a result of this construction, a player may begin gameplay faster, may cashout faster, and may receive promotions or coupons provided by the casino on their personal electronic device, whether or not the player is currently interacting with an electronic gaming machine. Additionally, an electronic gaming machine, such as described herein, can optionally be manufactured without several traditional components that are subject to mechanical failure, such as ticket in/ticket out mechanisms, voucher printers, bill validators, and so on. As a result, such electronic gaming machines may exhibit improved reliability and uptime over the life of the machine.

Continuing the example introduced above, in many embodiments, an application executed by a personal electronic device of a player facilitates wireless communication (using one or more standardized or proprietary wireless communication protocols) with a wireless communication module of a dedicated processing unit in an electronic gaming machine in order to establish a secure communication channel between the personal electronic device and the dedicated processing unit. Thereafter, the personal electronic device and the dedicated processing unit can exchange information securely. Example wireless communication protocols include, but are not limited to: Wi-Fi; Bluetooth; near-field communication; infrared; optical communication; cellular communication; acoustic communication; image-based communication; fiducial markers for image processing; and so on.

In other examples, the personal electronic device is directly and/or conductively coupled to the dedicated processing unit in the electronic gaming machine (e.g., via cable or dock) in order to establish a secure communication channel between the personal electronic device and the dedicated processing unit.

In these examples, as noted above, once a secure communication channel is established, the personal electronic device can transmit or otherwise convey any suitable information to the dedicated processing unit. Such information can include, but is not limited to: a player's identity information (e.g., name, date of birth, gender, biometric information, and so on); a player's financial information (e.g., account numbers, account identifiers, routing numbers, credit card numbers, player account information); a player's preference or historical information (e.g., player history, gameplay history, player preferences, and so on); data from one or more sensors of the personal electronic device (e.g., temperature, camera data, microphone data, and so on); and so on.

In response, in one embodiment, the dedicated processing unit can communicate with a local or remote server that maintains an account associated with the player. If the player's account balance exceeds a minimum threshold level necessary to enable gameplay on the electronic gaming machine, the local or remote server sends a signal to issue gameplay credit to a game machine processing unit in the electronic gaming machine, allowing the player to play a game presented by the electronic gaming machine.

Phrased in another, non-limiting, manner, these embodiments substitute and/or supplement conventional cash, ticket in/ticket out, player card, and/or other conventional systems and methods of enabling cashless interactions between a player and an electronic gaming machine in a casino environment. As a result of this construction, as noted above, an electronic gaming machine can be operated and/or constructed with fewer components that are subject to periodic mechanical failure (e.g., bill validators, printers, card readers, and so on), thereby increasing the reliability and uptime of the electronic gaming machine. In addition, as a result of this construction, a player can benefit from increased control and authority over cashless transactions performed and/or facilitated by electronic gaming machines in a casino environment.

For simplicity of description, many embodiments herein reference a "casino" as an example gaming industry entity, although it is appreciated that this is merely one example. Similarly, for simplicity of description, the phrase "electronic gaming machine" as used herein is generally understood to refer to a stationary slot machine within a casino, however, it may be understood that this is merely one example of an electronic gaming machine. In other words, in some embodiments, other gaming industry entities and/or other stationary, portable, and/or digital (e.g., software-based) electronic gaming machines and/or services may be suitable for use with the various embodiments described herein and equivalents thereof.

The phrase "personal electronic device" and equivalents as used herein refers to any electronic device under the control of a player in a casino, whether that device is owned and operated by the casino (e.g., and lent to the player while the player is in the casino) or by a particular player. Example personal electronic devices include, but are not limited to: cell phones; tablet computers; laptop computers; smart watches; smart wrist bands; wireless paging system pagers; key fobs; Bluetooth-enabled or Wi-Fi enabled accessory devices (e.g., headphones, health monitors, and so on); and so on.

Components of a personal electronic device, such as described herein, can include, but are not necessarily limited to, one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on.

The personal electronic device can include a display. The display can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

In many embodiments, one or more components of the personal electronic device can include or can be communicably coupled to circuitry and/or logic components, such as a processor and a memory. The processor of the personal electronic device can be implemented as any personal electronic device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Still further embodiments described herein reference systems and methods for recording particular transactions performed in a casino environment with particular electronic gaming machines and particular users. More broadly, these embodiments reference a centralized or decentralized distributed computer network architecture in which transactions performed in a casino environment are each cryptographically signed (e.g., by a player, an electronic gaming machine, another server, or any other suitable intermediary or authority), stored, and recorded on a distributed leger.

These and other embodiments are discussed below with reference to FIGS. 1A-10. However, those skilled in the art will readily appreciate that the detailed description given herein with respect to these figures is for explanatory purposes only and should not be construed as limiting.

Generally and broadly, FIG. 1A depicts a simplified system diagram of a casino environment including an electronic gaming machine, a personal electronic device, and a distributed network architecture such as described herein. These elements, among others, are discussed in greater detail below.

As noted above, a casino operator (herein, more broadly, a "gaming industry entity") typically provides numerous electronic devices on casino floors and elsewhere at which the operator is required to identify and authenticate players and track transactions arising between players and the various electronic devices on the casino floor. Examples of such electronic devices include electronic gaming machines, point-of-sale terminals, electronic table games, and so on.

More specifically, casino operators are commonly required to track transactions involving "cash" and its equivalents, where "cash" collectively herein refers to any form of financial consideration, such as currency bills issued by a governmental entity, bank credits, house credits, pre-paid local or remote accounts, and any other form of transferrable denominations of financial value and/or denominations that may be exchanged for denominations of financial value, whether inside the casino or elsewhere.

To facilitate the tracking and auditing of such transactions and the transfers of cash by and between players and casino operators, conventional casino operators often encourage players to utilize casino-issued "cards" or paper vouchers, typically referred to as "ticket in/ticket out" cards or paper voucher/receipts. A ticket in/ticket out card essentially identifies a player (e.g., by displaying/printing the player's name on the card) and associates a given "point" value with the player. Typically, the point value is also stored in a casino accounting system in a "player account" that associates the player's name and identity information with all vouchers and points credited to that player. The player may attempt to limit access and use of a ticket in/ticket out card, however, in a conventional casino environment, any person in possession of the player's ticket in/ticket out card may be able to transfer value from that card; typically casinos only verify the identity of a player when a ticket in/ticket out voucher is presented to be exchanged for cash.

To use a ticket in/ticket out card, a player—or, more generally, any individual in possession of the card—will fund an account associated with the ticket in/ticket out card by presenting cash to the casino or by debiting one or more real money accounts, such as a checking or savings account with a financial institution, or charging one or more credit card or similar accounts. These debits and credits are exchanged for casino "points" redeemable at the casino and other physical and digital properties.

Points in a player account may be redeemed for practically any purpose in a casino environment, including wagering, bets using a casino game, purchasing meals or other goods, attending shows, or other activities. Points may also be converted back into cash at the player's request. The exchange of cash for points and vice versa may occur at booths, at electronic gaming machines, betting tables, online, via mobile device software applications, or otherwise. Regardless of how such transactions occur, regulatory bodies require a tracking of each point at each instance in a transactions flow including from the instance at which a point is generated (in exchange for cash), utilized (for example, wagering outcomes in an electronic gaming machine, or for an in-casino purchase), and/or reconverted into cash or some other form of consideration provided to the player.

Typically, point tracking occurs across multiple casino computer systems and devices including, for example, master casino tracking systems, slot management systems, ticket in/ticket out management systems, point-of-sale systems, property management systems, such as those used for lodging, recreation and similar casino related operations, individual electronic gaming machines, and otherwise. Each of these and other devices are communicably coupled to a central accounting server (or group of servers) that process and record each transaction.

In another, non-limiting phrasing, practically any device or system involved in the granting, redeeming, transfer, or use of a point in a casino environment is commonly required to track each point, as well as the identity of the player acquiring, redeeming, or otherwise transferring such points. As may be understood, these requirements impose a high layer of complexity on casino games, systems, and operators.

Further, the underlying game-play of casino gaming machines and systems are tightly regulated by one or more regulatory bodies that may vary from jurisdiction to jurisdiction. As noted above, any change to certain hardware and/or software components of an electronic gaming machine often requires re-verification and re-approval by gaming regulators. The re-certification process can be lengthy and expensive and, during the process, an electronic gaming machine is taken offline and is unavailable to players.

These regulatory and technical constraints often discourage casino operators from changing the underlying gameplay functionality or otherwise modifying casino games, including the game machine processing unit(s) that facilitate gameplay, manage betting, and/or maintain meters in an electronic gaming machines. Instead, new functionality and hardware is typically designed in such a manner as to be isolated and/or insulated from any regulated hardware or software components, and, ideally, to not require interaction with them at all.

Additionally, as may be appreciated, electronic gaming machines may be in operation for decades. It is therefore often desirable for new features and functionality to be easily retrofitted to older electronic gaming machines, some of which may not have been designed with modern technological capabilities in mind.

One conventional approach for addressing some of the above-referenced regulatory challenges has involved the optional use of a dedicated peripheral controller, commonly known as a slot machine interface board. A peripheral controller enables an electronic gaming machine and/or an external server or system to communicate with one or more peripheral devices without the involvement of or interaction with a game machine processing unit. These peripheral devices typically do not affect underlying game-play of an electronic gaming machine (which is controlled by a game machine processing unit) but do provide additional incentives and features to players. For example, rewarding of coupons, notifying players of promotions, or otherwise are often provided by peripheral devices interconnected to one or more electronic gaming machines by one or more peripheral controllers.

A peripheral controller also may enable an electronic gaming machine to communicate with other casino system servers and external servers over one or more networks, again without involving the game machine processing unit. In further examples, other designs are considered, some of which virtualize the function of a peripheral controller within a electronic gaming machine processor. Depending on a particular implementation, different approaches may be required to incorporate new functionality without requiring re-certification of the game machine processing unit. Several examples of such systems are described in U.S. Patent Application No. filed on Sep. 22, 2016, and entitled "Bill Validation and Cash Dispensing Device, System and Method for Use in a Casino Context," the entire contents of which are incorporated herein by reference.

In still further embodiments or examples, a peripheral controller may not be required. In these examples, a game machine processing unit in an electronic gaming machine can communicate with other casino systems and external servers directly. In still further embodiments, a game machine processing unit may be implemented as software operating in a container or virtual machine on a processor within the electronic gaming machine, a peripheral controller, or any other suitable local or remote processor.

As such, generally and broadly, for embodiments described herein, a dedicated processing unit can be installed in an electronic gaming machine cabinet as an additional peripheral device configured to communicate with the peripheral controller.

In many embodiments, one or more components of the dedicated processing unit can include or can be communicably coupled to circuitry and/or logic components, such as a processor and a memory. The processor of the personal electronic device can be implemented as any personal electronic device capable of processing, receiving, or transmitting data or instructions. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

The dedicated processing unit is configured to communicate with, and securely transact information with, a personal electronic device of a player. As a result of this construction, when the dedicated processing unit receives identity or identifying information from a personal electronic device, the peripheral device can coordinate the connection of the player's account to the electronic gaming machine to quickly and efficiently enable game play for that player on that machine. In some cases, this process is performed transparently to the player; a player can sit at an electronic gaming machine and immediately begin interacting with that machine. In other embodiments, the process is performed with user interaction; a player can sit at an electronic gaming machine and receive an alert on their personal electronic device requesting permission to associate the player's account with that electronic gaming machine. In each of these, and other, examples provided herein, the player is not required to handle, secure, or maintain any player card, voucher, or other cashless token in order to interact with an electronic gaming machine in a casino.

One example embodiment of a system such as described herein is depicted in FIG. 1A. As shown in FIG. 1A, and for at least one embodiment such as described herein, a system 100 includes a game machine processing unit 102 that is communicatively coupled to a peripheral controller 104.

In the illustrated embodiment, the peripheral controller 104 is communicatively coupled to one or more peripheral devices, such as a printer 106, a bill validator 108, and a dedicated processing unit 110*a* that includes (or is otherwise coupled to) a mobile interface device 110*b* configured to communicate with a personal electronic device 112. In other embodiments, other peripheral devices may be included such as, but not limited to: displays; buttons; uninterruptable power supplies; networking devices; and so on.

In the illustrated embodiment, as noted above, the peripheral controller 104 is communicatively coupled to the mobile interface device 110*b* of the dedicated processing unit 110*a*, which, as discussed further below, facilitates the identification, authentication, and tracking of the player while the player is interacting with the game machine processing unit 102.

More specifically, the mobile interface device 110*b* of the dedicated processing unit 110*a* is configured to establish a secure connection with a personal electronic device 112 (and/or an application executing on the personal electronic device 112) of a player using any suitable technique.

In one embodiment, each of the game machine processing unit 102, the peripheral controller 104, and the mobile interface device 110*b* of the dedicated processing unit 110*a* is provided or disposed, either entirely or partially, in a gaming machine cabinet 114. The printer 106 and the bill validator 108 may also be provided, if desired, in the gaming machine cabinet 114, or separately, as desired for any given implementation of one or more of the present embodiments or an equivalent thereof.

As noted with respect to other embodiments described herein, the mobile interface device 110*b* of the dedicated processing unit 110*a* may be configured to utilize any mobile device interconnection components, protocols, and technologies, including, but not limited to, Bluetooth, Wi-Fi, near-field communications, cellular, and other known and/or later to be discovered wireless communications protocols, devices, and systems and otherwise. In many examples, the mobile interface device 110*b* of the dedicated processing unit 110*a* includes at least one wired connection that can directly and/or conductively couple to a personal electronic device (e.g., via a cable connection, a dock, and so on). Several examples of mobile interface devices and uses thereof are described in U.S. patent application Ser. No. 15/482,668, filed on Apr. 7, 2017, and entitled "Device, System, and Method for Facilitating communications Between Electronic Gaming Machines and Mobile Devices," the entire contents of which are incorporated herein by reference.

In one embodiment, the mobile interface device 110*b* of the dedicated processing unit 110*a* is configured for communicating, via one or more wireless radio frequency protocols, data signals to and from a personal electronic device 112 using near-field communications and Bluetooth protocols. For simplicity of description, this example is discussed in greater detail below, but it may be appreciated that this is merely one example embodiment; other systems, such as described herein, can configure a mobile interface device 100 to communicate with the personal electronic device 112 using any other suitable technique.

Continuing the example introduced above, the personal electronic device 112 may be configured to identify and authenticate a player associated with the personal electronic device 112 to one or more servers provided in a casino system, such as a casino management system server 118. More specifically, the personal electronic device 112 can include a processor and a memory in which identifying information of the player is stored. The processor of the personal electronic device 112 can be configured to execute a program, application, or service according to executable instructions stored in the memory. The application, when launched by the processor, can optionally provide a player with a graphical user interface to input, edit, or remove various personally-identifying details such as, but not limited to: name information; address information; tax information; photographic information; driver's license information; financial information; and so on. In other embodiments, the application executed by the processor of the personal electronic device 112 can be configured to access one or more details stored in a preferences file in the memory. In yet another example, the application executed by the processor of the personal electronic device 112 can be configured to access one or more remote databases to establish or obtain identity or identifying information of the player operating the personal electronic device 112. Example remote databases include, but are not limited to: cellular service subscriber databases; social media or social network databases; third-party authentication services; government or municipal licensing services; and so on. In still further examples, the application executed by the processor of the personal electronic device 112 can present a graphical user interface that requests a user of the personal electronic device 112 to manually input identifying information and/or credentials manually. For example, the personal electronic device 112 may request that a user of the personal electronic device 112 submit credentials to log into a third-party database, such as a social media website or a third-party authentication service or an account server provided by or otherwise associated with the casino.

It may be appreciated that the foregoing example embodiments are not exhaustive; it may be appreciated that a personal electronic device, such as described herein, can be configured to store, obtain, and/or otherwise retrieve suitable identifying information sufficient to associate a player or other operator or holder of the personal electronic device with one or more accounts associated with the casino or a particular electronic gaming machine. In other embodiments, a personal electronic device can, without limitation:

request an account number to verify a player's identity; take a picture with a camera module to verify a player's identity; request or require a player solve a Turing test; request or require a user to provide biometric information (e.g., fingerprint, facial depth map, vein map, iris scan, and so on); request or require a user to repeat a phrase into a microphone; request or require a user to log into one or more third-party services or websites; request or require a user to present a code generated on the personal electronic device to an employee of the casino, an electronic gaming machine, or another device; request or require a user take a photo or scan a government-issued identity document, such as a driver's license or passport; request or require a user enter a pin code or passcode every time identity information is requested by an electronic gaming machine or a dedicated processing unit in an electronic gaming machine; request or require a user agree to a terms of use document or agreement; request or require a user verify the user's age; request or require the user take a photograph or scan of a credit or debit card; and so on or any combination, sequence, or series thereof.

Further, it may be appreciated that a personal electronic device can communicate information about a player in any suitable manner to a dedicated processing unit, such as the dedicated processing unit 110*a*. For example, a personal electronic device such as described herein can communicate—either encrypted or unencrypted—without limitation: a name; a birthdate; a picture; a driver's license number; a passport number; a pin code; an account number; a cryptographic signature or public key; an account balance; a wager preference (e.g., max, min, denomination, and so on); a diet preference; a drink preference; a gameplay parameter preference (e.g., playback speed, animation preferences; bet parameters, and so on); a show or event attendance preference; a time or duration since a particular event; a citizenship; an age; an address; version information about an operating system of the personal electronic device; version information about an application operating on the personal electronic device; performance information about the user; betting history of the player; and so on or any combination, sequence, or series thereof.

In view of the foregoing, it may be appreciated that a personal electronic device, such as described herein, can be configured in any suitable manner to request or obtain information about a player in any suitable way. As such, the phrase "information" about a player as used herein is understood to refer to any information or data—whether stored in, accessed by, obtained by, provided to, or requested by a personal electronic device—relevant or otherwise related to a player or the player's personal electronic device(s). This information can be communicated in an encrypted or unencrypted manner, in a compressed or uncompressed manner, and according to any suitable file format or data transmission protocol now known or later discovered.

Returning to the example presented in FIG. 1A, it may be understood that the personal electronic device 112 may be provided by a player, provided by the casino, or otherwise. As noted above, the personal electronic device 112 may be any device configured to wirelessly identify and/or authenticate a player to a casino management system server, such as the casino management system server 118. Examples of such personal electronic devices include but are not limited to smart-phones, smart-watches, and other personal mobile computing devices capable of communicating with an electronic gaming machine over a wireless connection. In accordance with at least one embodiment and as discussed in greater detail below, such wireless connections are authenticated and secure.

Furthermore, it is to be appreciated that the communications paths and/or linkages utilized to communicatively couple each of the game machine processing unit 102, the peripheral controller 104, and the mobile interface device 110*b* of the dedicated processing unit 110*a* may utilize any desired medium, such as copper wire, printed circuit boards, optical cables, wireless pathways or otherwise. In one embodiment, universal serial bus (universal serial bus) compatible communication components are utilized to communicatively couple the peripheral controller 104 with the mobile interface device 110*b* of the dedicated processing unit 110*a*. In other embodiments, any known or hereafter developed communication components may be utilized to communicatively couple the mobile interface device 110*b* of the dedicated processing unit 110*a* to any other component in a gaming machine cabinet 114.

In yet another embodiment, the communications components utilized to communicatively couple the printer 106, the bill validator 108, or the mobile interface device 110*b* of the dedicated processing unit 110*a* to one or more of the game machine processing unit 102 and the peripheral controller 104 may utilize a single medium with the data signals communicated between such devices being separated, interleaved, addressed, or otherwise communicated. In short, any known or hereafter developed communications technologies may be used to communicatively couple one or more components in the gaming machine cabinet 114 with a second or more other components.

Such technologies may also be configured, as desired for any given embodiment, to facilitate the removal and replacement of any given component as such needs may arise, for example for repair, updating or otherwise. It is also to be appreciated that electrical power for one or more components provided in the gaming machine cabinet 114 may be provided, in whole or in part, by another component disposed within the gaming machine cabinet 114.

For example, the mobile interface device 110*b* of the dedicated processing unit 110*a* can be communicatively connected to the peripheral controller 104 over a universal serial bus connection may rely upon power provided by the peripheral controller 104 via the universal serial bus connection.

In other embodiments, power for the mobile interface device 110*b* of the dedicated processing unit 110*a* may be provided by any known or later arising technology. Any known or later developed communications protocols, such as universal serial bus 3.0 or other, may be used to facilitate communications between the mobile interface device 110*b* of the dedicated processing unit 110*a*, the peripheral controller 104, and one or more casino management system servers, such as the casino management server 118.

It is also to be appreciated that while depicted in or elsewhere in conjunction with the various embodiments described herein, the components of gaming machine cabinet 114 may be provided internal or external to the cabinet and may exist as any desired combination of hardware and software elements. It is to be appreciated that certain of such hardware and/or software elements may exist virtually and may utilize hardware and software components that may be utilized by another of the gaming machine cabinet components.

The gaming machine cabinet 114 may be configured to include other components which are not shown in FIG. 1A. Examples of such other components include but are not limited to ticket in/ticket out card readers, dispensers of items, such as beverage dispensers, user interface components, and otherwise. One or more of such other components may be configured to communicate with the mobile interface device 110*b* of the dedicated processing unit 110*a* directly or indirectly, for example, via the peripheral controller 104.

The game machine processing unit 102 may be configured to provide any desired gaming experience to a player. For example, in one embodiment game machine processing unit 102 may be a slot machine, a video poker game, or any other gaming experience. In one embodiment, a gaming table and a dealer may replace the game machine processing unit 102. In one embodiment, a gaming machine cabinet 114 may provide the option for non-regulated experiences, with an electronic gaming machine or other component providing various types of non-gambling user interfaces, such as video games for minors and otherwise. It is to be appreciated that the various embodiments described may be utilized in conjunction with such non-gambling and gambling implementations. Accordingly, a game machine processing unit 102 can provide any type of player desired interactive experience, both regulated or non-regulated. An electronic gaming machine, such as described herein, may include any desired hardware and software components needed to provide the desired gaming or other interactive experience. The types of gaming and other experiences and the technical capabilities of an electronic gaming machine to provide such experiences are beyond the scope such as described herein.

The peripheral controller 104 may be configured to operate as a smart device with respect to one more components of the gaming machine cabinet 114, wherein the peripheral controller 104 itself executes one or more software/logical programs or controls needed by one or more of the mobile interface device 110*b* of the dedicated processing unit 110*a* or other component of the gaming machine cabinet 114. The peripheral controller 104 may also be configured to directly or indirectly control the operations of any application program executing on the personal electronic device 112, when the personal electronic device 112 is communicatively coupled to the mobile interface device 110*b* of the dedicated processing unit 110*a*.

When configured in accordance with at least one embodiment such as described herein as a smart device, the peripheral controller 104 may be configured to be communicatively coupled, directly or indirectly, to a promotion server 120 such that the peripheral controller 104 has direct access to the various premium features of the system 100. In furtherance of such a system configuration, the peripheral controller 104 may be configured with one or more drivers and/or application program interfaces which enable the promotion server 120, via the peripheral controller 104 and the mobile interface device 110*b* of the dedicated processing unit 110*a*, to control one or more features and functions of the personal electronic device 112, including for example, the information, features and functions provided by an application program executing on the personal electronic device 112.

In one embodiment, the mobile interface device 110*b* of the dedicated processing unit 110*a* may be configured to instruct the personal electronic device 112 to present a link to a mobile application. Upon selection of such a link, a mobile application program associated with the casino operator may be automatically, semi-automatically (requiring some user interaction), or manually downloaded, installed, and selected for execution on the mobile device. The mobile interface device 110*b* of the dedicated processing unit 110*a* may also be configured to instruct the personal electronic device 112 to execute a mobile payment option.

In another embodiment, the peripheral controller 104 may be configured to operate as a pass-through type device with respect to one or more components of the gaming machine cabinet 114, wherein the peripheral controller 104 essentially acts as a router or hub by which communications by and between the mobile interface device 110*b* of the dedicated processing unit 110*a* are routed and directed to other system 100 components, such as a casino management system server 118 or other internal server 116 components.

When configured in accordance with at least one embodiment such as described herein as a pass-through device, the peripheral controller 104 may be configured to enable, for example, the promotion server 120 to communicate with and control the operation of the mobile interface device 110*b* of the dedicated processing unit 110*a* and the personal electronic device 112 communicatively coupled to the mobile interface device 110*b* of the dedicated processing unit 110*a*. As configured as a pass-through device, the peripheral controller 104 may be further configured to pass data messages between the promotion server 120 and the mobile interface device 110*b* of the dedicated processing unit 110*a* to the player's the personal electronic device 112.

In yet another embodiment, the peripheral controller 104 may not physically exist in a gaming machine cabinet 114. Instead, one more other gaming machine cabinet 114 components, such as a game machine processing unit 102 or the mobile interface device 110*b* of the dedicated processing unit 110*a*, may provide such various features and functions. It is also to be appreciated that the hardware and/or software providing the features and functions of the peripheral controller 104 in either of the smart-device and/or pass-through device configurations may be provided in other internal server 116 components, for example, as a virtual machine operating on a casino management system server 118.

It is to be appreciated that a casino system may include two or more gaming cabinets 114, with peripheral controllers 104 in each of such gaming cabinets using different modes of operation. For example, a first peripheral controller may utilize a smart-device mode of operation, while a second peripheral controller utilizes a pass-through mode of operation. Further, the peripheral controller 104 may be configured to change its mode of operation based upon mobile device type utilized, transaction requested, or otherwise. For example, the peripheral controller 104 may use the smart device mode when a mobile device is near-field communication compatible and a pass-through mode when the mobile device is not near-field communication compatible.

The mobile interface device 110*b* of the dedicated processing unit 110*a* may be configured to operate in accordance with one or more system protocols. Such protocols may be configured, for example, to govern when the mobile interface device 110*b* of the dedicated processing unit 110*a* can and cannot be utilized. The mobile interface device 110*b* of the dedicated processing unit 110*a* may be configured to identify and authenticate the personal electronic device 112 by the presence of any desired form of electronic identification or other provisioning of data.

By way of illustration only and not by means of limitation, examples of such electronic identification forms may include near-field communication generated signals, Wi-Fi signals, Bluetooth signals, other known communications technologies, and optical images such as two-dimensional bar codes, QR codes, and otherwise.

In one embodiment, the mobile interface device 110*b* of the dedicated processing unit 110*a* may be configured to receive other forms of information provided on "tickets" or "tags" such as a player's signature, or a code or other identifier provided by a player using, for example, a touch screen compatible user interface on the personal electronic device 112 or otherwise. The mobile interface device 110*b* of the dedicated processing unit 110*a* may be configured to include optical character generation capabilities, pattern generation capabilities and other forms of signal and character generation technologies. In accordance with at least one embodiment, the mobile interface device 110*b* of the dedicated processing unit 110*a* may be provided in conjunction with the bill validator 108 or the printer 106.

Per at least one embodiment, the system 100 may be configured to utilize the printer 106, the bill validator 108, a display provided by a game machine processing unit 102 or other device capable of generating a QR code readable by the personal electronic device 112. The so generated QR code may be printed, e.g., as a ticket, or displayed on a display. The QR code may be utilized to provide the personal electronic device 112 with information sufficient to pair the personal electronic device 112 with the mobile interface device 110*b* of the dedicated processing unit 110*a* for a given session. Accordingly, it is to be appreciated that for at least one embodiment such as described herein, the mobile interface device 110*b* of the dedicated processing unit 110*a* may be configured but does not have to be configured, for any given session or otherwise, to possess or utilize near-field communication communications capabilities to pair the mobile interface device 110*b* of the dedicated processing unit 110*a* with the personal electronic device 112.

A unique identifier may identify the mobile interface device 110*b* of the dedicated processing unit 110*a*. Examples of identifiers include, but are not limited to, network addresses, device addresses, media access control addresses, serial numbers, unique sequences of numbers, by a grouping of two or more mobile interface devices in a casino system, or otherwise.

For at least one embodiment, the mobile interface device 110*b* of the dedicated processing unit 110*a* may be identified by an address provided with a near-field communication transceiver. It is to be appreciated that such address may be unique for each session based upon an encryption code being passed by the mobile interface device 110*b* of the dedicated processing unit 110*a* to the personal electronic device 112 for any given session. The mobile interface device 110*b* of the dedicated processing unit 110*a* may be configured to accumulate, monitor, and provide various metrics regarding the mobile interface device 110*b* of the dedicated processing unit 110*a* usage including, for example, usage data, device health, status, and other parameters that may be desired by a casino operator, regulators, players, or any combination of the preceding.

In some cases, the mobile interface device 110*b* of the dedicated processing unit 110*a* may be identified by a static address passively broadcast by a near-field communication transmitter disposed on or within the gaming machine cabinet 114. In other cases, the opposite construction may be used; a personal electronic device (such as the personal electronic device 112) can identify itself to the mobile interface device 110*b* of the dedicated processing unit 110*a* by passively broadcasting a static address by a near-field communication transmitter disposed on or within the personal electronic device 112. In still further examples, a personal electronic device (such as the personal electronic device 112) can identify itself to the mobile interface device 110*b* of the dedicated processing unit 110*a* by passively broadcasting a static address by a near-field communication transmitter disposed within a player card, a payment card, an identity document, a token, a ticket, or other object associated with—or otherwise linked to or operationally associated with—the personal electronic device 112 or the player associated with the personal electronic device 112.

The peripheral controller 104 may be communicatively coupled to a network 122. In accordance with at least one embodiment, the network 122 may be utilized exclusively by the casino such that it is physically and/or logically closed to outside systems and intruders. One or more firewalls and closed/restricted data ports, or other approaches may be used to restrict access to casino system endpoints. The network 122 may utilize any known or later arising networking technology. The network 122 may include and utilize local area networks, wide area networks, the Internet, or any other communications configuration, topologies, mediums, protocols, and technologies.

The network 122 communicatively interconnects one or more servers, databases, devices, and/or systems utilized by a casino for its operations, accounting, reporting, marketing, management, sales, and other purposes. Examples of such servers include casino management system server 118, a slot management system server 124, an accounting server 126, a property management system server 128, a point of sale system server 130, and the promotion server 120.

It is to be appreciated that the storage and/or communication of data by and between any of the components of system 100 may be encrypted. Any desired single or combination of encryption technologies may be utilized by system 100 components, including but not limited to the use of secure socket layers, virtual private networking, public/private keys, 128-bit, 256-bit and other encryption algorithms, or other known or later arising encryption algorithms, techniques and technologies.

For at least one embodiment, upon authentication of a player's personal electronic device (such as the personal electronic device 112) by the casino, communications between the mobile interface device 110*b* of the dedicated processing unit 110*a* and the personal electronic device are encrypted. Such communications may be further communicated, in clear or encrypted form, between the mobile interface device 110*b* of the dedicated processing unit 110*a* and, via the peripheral controller 104, one or more internal servers 116.

It is also to be appreciated that in accordance with at least one embodiment any two or more of the networked system components, such as casino management system server 118 and the promotion server 128, may be logically, physically, virtually, directly, or indirectly communicatively coupled to the mobile interface device 110*b* of the dedicated processing unit 110*a*. Such communications couplings may include the use of one or more application program interfaces such that communications between any two components may conform to one or more protocols configured to authorize, access, control or otherwise manage one or more features or functions provided by the system 100 and components thereof.

As further shown in FIG. 1A, for at least one embodiment, the system 100 may include the use of one or more external networks, identified in FIG. 1A as the network 132. The network 132 may utilize any desired data communication technologies, protocols, mediums, and topologies. In accordance with at least one embodiment, the network 132 includes the Internet. The network 132 may be configured to communicatively connect the internal server 116 with one or more third-party and/or external server systems, for example, a lottery server 134, a pari-mutuel or a mutual betting server 136, a marketing server 138, and/or a sports or event betting server 140. Collectively, the external server (s) are identified in the figure as the external servers 142. It is to be appreciated that the services provided by one or more of such third-party systems and servers may be provided as a premium feature to a player. For at least one embodiment, such third-party systems and servers may be accessible to a player using the personal electronic device 112 communicatively coupled to the mobile interface device 110*b* of the dedicated processing unit 110*a*.

The foregoing embodiments depicted in FIG. 1A and the various alternatives thereof and variations thereto are presented, generally, for purposes of explanation, and to facilitate an understanding of various configurations and constructions of a network architecture that facilitates communication by and between various components of a player's personal electronic device, an electronic gaming machine, and/or one or more casino servers or systems, and the various components thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 1B:
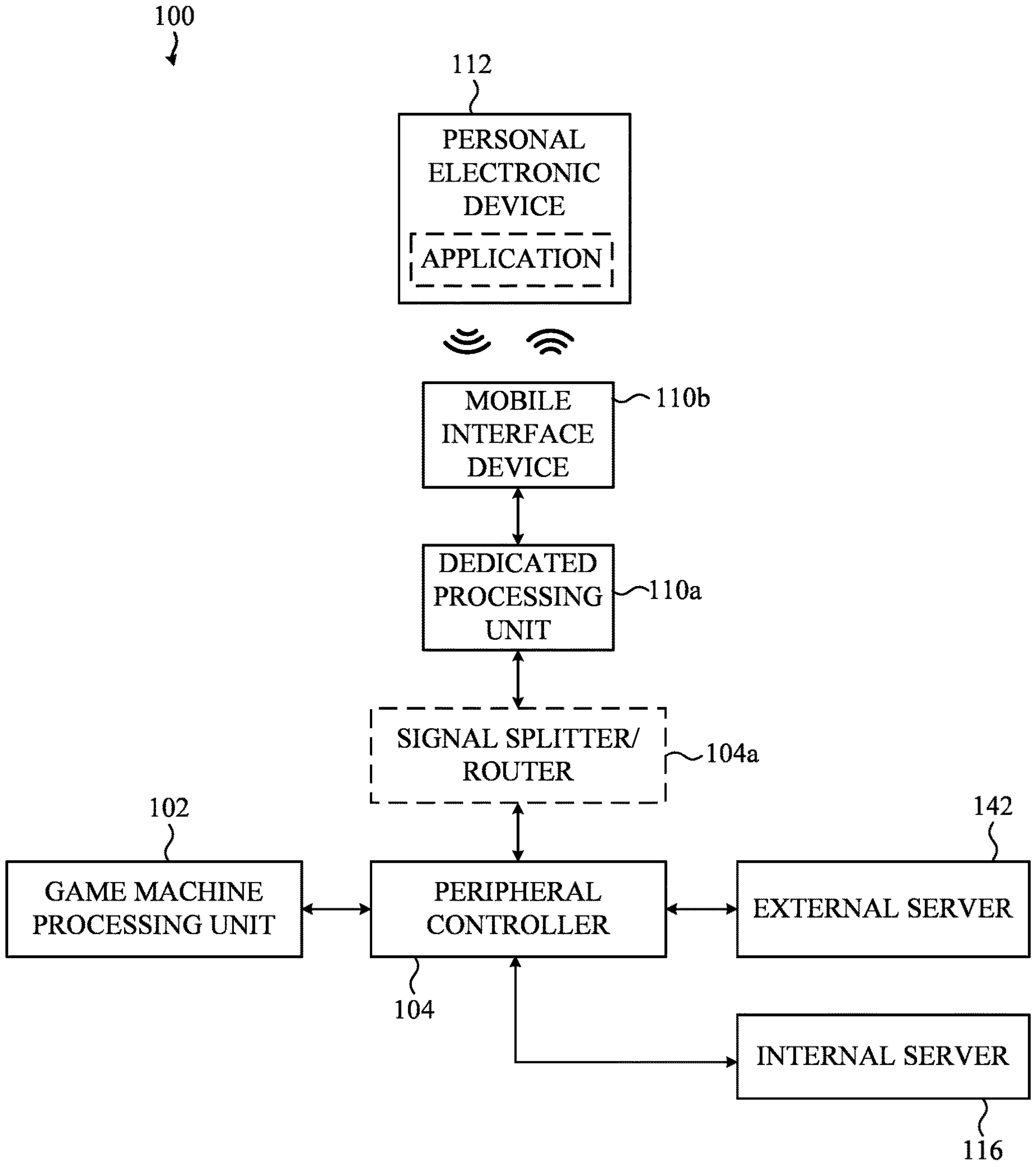
FIG. 1B is a simplified schematic representation of a casino system configured for use in accordance with at least one embodiment such as described herein.

For example, FIG. 1B depicts a simplified system diagram of the system depicted in FIG. 1A, omitting certain elements for simplicity of illustration and description. As illustrated, the system 100 includes the game machine processing unit 102 which is communicably coupled to the peripheral controller 104. As described above, the peripheral controller 104 can be coupled to both internal and external servers (identified, respectively, as the internal server 116 and the external server 142) and to the dedicated processing unit 110*a* that, in turn, includes or is coupled to the mobile interface device 110*b*. In some embodiments, such as shown in FIG. 1B, a signal splitter and/or router—identified as the signal splitter/router 104*a* can interpose the peripheral controller 104 and the dedicated processing unit 110*a*, but this may not be required of all embodiments. Also depicted in the simplified system diagram is the personal electronic device 112, which is communicably coupled—across a wireless communication link—to the mobile interface device 110*b* of the dedicated processing unit 110*a*.

As noted above, although certain examples are provided above, it may be appreciated that a personal electronic device can communicate identity or other information to one or more casino servers or services in a number of suitable ways and for a number of suitable purposes. Several examples are provided below.

For simplicity of illustration and description, the following example embodiments reference a player in a casino with a Bluetooth-enabled cellular phone. The example embodiments described below also reference an electronic gaming machine including a dedicated processing unit configured for Bluetooth communication. The examples also reference a casino-controlled (i.e., internal to the casino) accounting server that manages a funded player account associated with the player. In these examples, the accounting server is in communication with the electronic gaming machine and/or the dedicated processing unit.

As a first example, the dedicated processing unit can periodically scan or monitor for the presence of Bluetooth devices (e.g., via device/service discovery, passive Bluetooth beacon or advertisement monitoring, and so on). Once the player's cell phone is within Bluetooth range of the dedicated processing unit of the electronic gaming machine, the dedicated processing unit can provide a signal to the electronic gaming machine and/or the accounting server that indicates the player is nearby the portion of the casino floor at which the electronic gaming machine and the dedicated processing unit are installed.

In further embodiments, more than one dedicated processing unit may be able to detect the presence of the player's cell phone based on a Bluetooth response or signal provided by that cell phone. In these examples, the player's position on the casino floor may be triangulated to increase accuracy. By locating the player on the casino floor in this manner, the accounting server can reject any requests to access the player's account from electronic gaming machines and/or dedicated processing units in other locations of the casino (or elsewhere). In this manner, and as a result of this construction, access to the player's account is geographically limited thereby substantially increasing security for the benefit of the player.

In another example, the dedicated processing unit can be configured to initiate a Bluetooth connection to the player's cell phone after the player positions the cell phone on or near a near-field communications antenna. Once a Bluetooth connection is established, the cell phone can provide identity information about the player to the dedicated processing unit which, in turn, can communicate—either directly or through the peripheral controller—to an internal or external server. The server can communicate back to the dedicated processing unit and/or the peripheral controller to confer gameplay credits to the electronic gaming machine from the player's account. In this manner, and as a result of this construction, after the player positions his or her cell phone over the near-field communications antenna in the electronic gaming machine, gameplay can begin.

In another example, the dedicated processing unit can be configured to initiate a Bluetooth connection to the player's cell phone after the player positions a two-dimensional barcode displayed by the cell phone on or near a camera or barcode reader within the electronic gaming machine. Once a Bluetooth connection is established, the cell phone can provide identity information about the player to the dedicated processing unit which, in turn, can communicate—either directly or through the peripheral controller—to an internal or external server. The server can communicate back to the dedicated processing unit and/or the peripheral controller to confer gameplay credits to the electronic gaming machine from the player's account. In this manner, and as a result of this construction, after the player positions his or her cell phone over or near the barcode reader (or camera) in the electronic gaming machine, gameplay can begin.

In yet another example, the dedicated processing unit can be configured to initiate a Bluetooth connection to the player's cell phone after the player positions a camera of the cell phone in a position to read a two-dimensional barcode displayed on or near the electronic gaming machine. Once a Bluetooth connection is established, the cell phone can provide identity information about the player to the dedicated processing unit which, in turn, can communicate—either directly or through the peripheral controller—to an internal or external server. The server can communicate back to the dedicated processing unit and/or the peripheral controller to confer gameplay credits to the electronic gaming machine from the player's account. In this manner, and as a result of this construction, after the player positions his or her cell phone over or near the barcode displayed by or near the electronic gaming machine, gameplay can begin.

In yet another example, the dedicated processing unit can be configured to initiate a Bluetooth connection to the player's cell phone after receiving a signal from the player's cell phone. For example, the player may launch an application on the cell phone and make a selection in a graphical user interface indicating the user's intent to initiate gameplay. As with other embodiments described herein, once a Bluetooth connection is established, the cell phone can provide identity information about the player to the dedicated processing unit which, in turn, can communicate—either directly or through the peripheral controller—to an internal or external server. The server can communicate back to the dedicated processing unit and/or the peripheral controller to confer gameplay credits to the electronic gaming machine from the player's account.

In yet another example, the dedicated processing unit can be configured to initiate a Bluetooth connection to the player's cell phone after receiving a signal from the electronic game machine. For example, the player may make a selection in a graphical user interface provided on a display of the electronic game machine indicating the user's intent to initiate gameplay. As with other embodiments described herein, once a Bluetooth connection is established, the cell phone can provide identity information about the player to the dedicated processing unit which, in turn, can communicate—either directly or through the peripheral controller—to an internal or external server. Thereafter, the server can communicate back to the dedicated processing unit and/or the peripheral controller to confer gameplay credits to the electronic gaming machine from the player's account. The signal that initiates the Bluetooth connection can be transmitted and/or received using any suitable technology (e.g., Bluetooth, near-field communications, Wi-Fi, acoustic, optical, and so on) in any suitable manner. Examples of imitating signals include, but are not limited to: an image or barcode disposed on a gaming machine cabinet that is read by a camera or scanner in the personal electronic device; an image or barcode displayed or disposed on a personal electronic device that is read by a camera or scanner in an electronic gaming machine; a passive near-field communication signal sent from a tag, token, or a personal electronic device in possession of a player and received by a near-field communication module in an electronic gaming machine; a passive near-field communication signal sent from an electronic gaming machine and received by a near-field communication module in a tag, token, or a personal electronic device in possession of a player; an active near-field communication signal sent, in any direction, between a tag, token, or a personal electronic device in possession of a player and an electronic gaming machine; a sound or pattern of sounds (in a traditionally audible frequency band or in a traditionally inaudible frequency band) sent at any appropriate volume between, in any direction, a tag, token, or a personal electronic device in possession of a player and an electronic gaming machine; an image or pattern of light (in a traditionally visible frequency band or in a traditionally invisible frequency band) sent between, in any direction, a tag, token, or a personal electronic device in possession of a player and an electronic gaming machine; and so on or any combination thereof. In still further examples, the signal that initiates a Bluetooth connection can be triggered and/or sent—at least in part—in response to an output provided by a sensor in one or both of a personal electronic device or an electronic gaming machine. For example, in one embodiment, an accelerometer in a personal electronic device can detect an impact that, in turn, triggers the signal that initiates a Bluetooth connection with a particular selected electronic gaming machine. More simply, and from a player perspective, the operation of bumping the personal electronic device into an electronic gaming machine (thereby causing the accelerometer to register an impact beyond a particular threshold) causes the electronic gaming machine to securely pair with the personal electronic device to confer gameplay credits to the electronic gaming machine from the player's account.

As noted above, the foregoing example embodiments described in reference to FIGS. 1A—1B and the various alternatives thereof and variations thereto are presented, generally, for purposes of explanation, and to facilitate an understanding of various configurations and constructions of a network architecture that facilitates communication by and between various components of a player's personal electronic device, an electronic gaming machine, and/or one or more casino servers or systems, and the various components thereof, such as described herein. These examples are not exhaustive. However, it will be apparent to one skilled in the art that some of the specific details presented herein may not be required in order to practice a particular described embodiment, or an equivalent thereof.

Figure 2:
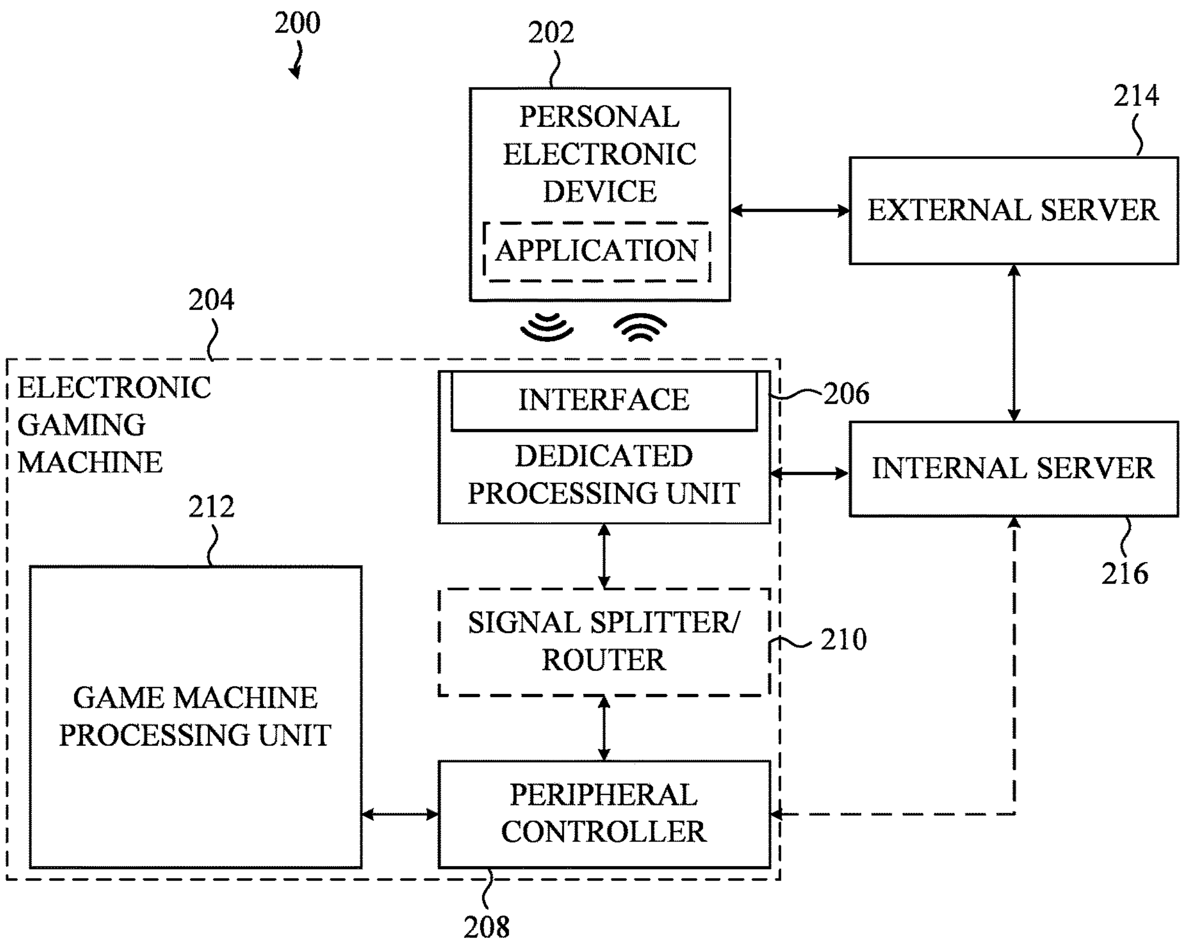
FIG. 2 is a simplified schematic representation of a casino system, such as described herein, in which a personal electronic device is configured to communicate with a server external to a casino network.

For example, FIG. 2 depicts a casino system similar to the system described in reference to FIGS. 1A-1B. In this system, however, a personal electronic device can be configured to communicate directly with an external server that, in turn, can communicate back to a casino system and/or a particular electronic gaming machine.

More specifically, in this embodiment, the system 200 includes a personal electronic device 202 that is configured to communicate with and transact information with an electronic gaming machine 204. More specifically, the personal electronic device 202, like other embodiments described herein, is configured to transact information wirelessly with a dedicated processing unit 206 within the electronic gaming machine 204. As with other embodiments described herein, the dedicated processing unit 206 can include an interface implementing any suitable hardware and/or software sufficient to transact information with the personal electronic device 202. Examples of such hardware and/or software are provided in reference to other embodiments described herein, and is not repeated here.

As with other embodiments described herein, the dedicated processing unit 206 of the electronic gaming machine 204 is communicably coupled to a peripheral controller 208. In some cases, a signal splitter/router 210 can be configured to route signals sent from the dedicated processing unit 206 to the peripheral controller 208 but, as noted with respect to other embodiments described herein, the signal splitter/router 210 may not be required.

As with other embodiments described herein, the electronic gaming machine 204 necessarily includes a game machine processing unit 212. Example functions and/or operations of a game machine processing unit, such as the game machine processing unit 212 are described in reference to other embodiments described herein, and are not repeated here.

In this example embodiment, the personal electronic device 202 is additionally configured to transact information with an external server 214. The external server 214 is understood to be external to the casino's on-premise network and/or services. Example external servers can include, but may not be limited to: banking servers; external casino servers; third-party account servers; social media servers; and so on.

The system 200 also includes an internal server 216. The internal server 216 is understood to be internal to the casino's on premise network. Example internal servers can include, but may not be limited to: an account management server; a transaction server; a promotional server; a point of sale server; a property server; a slot machine server; and so on.

As a result of the illustrated embodiment, a personal electronic device, such as the personal electronic device 202, can obtain identity information and/or security information from a server external to the casino's network. For example, the personal electronic device 202 can be configured to obtain a security token and/or a session key from the external server 214. The session key can then be communicated to the dedicated processing unit 206 that, in turn, can communicate the key back to the internal server 216, either directly or via the peripheral controller 208. In this manner, the internal server 216—in communication with the external server 214, can authenticate a secure session with the personal electronic device 202.

In another example, the personal electronic device 202 can be configured to receive a session key or security token from the dedicated processing unit 206. Thereafter, the personal electronic device 202 can communicate the session key—or another key generated, at least in part, by using the received session key—to the external server 214. The external server 214 can then send the same or another session key to the internal server 216 thereby authorizing access to (e.g., gameplay) the electronic gaming machine 204 by the player in possession of the personal electronic deice 202.

In yet another example, the personal electronic device 202 can be configured to send identifying information to the dedicated processing unit 206. In response, the dedicated processing unit 206 can send a request to the internal server 216—via the peripheral controller 208 or directly—to verify the identity information supplied by the personal electronic device 202. In some cases, the internal server 216 may compare the identity information supplied by the personal electronic device 202 to one or more entries stored in one or more databases accessible to the internal server 216. If a match is found, the internal server 216 may send a signal back to one or more components of the electronic gaming machine 204 authorizing access to (e.g., gameplay) the electronic gaming machine 204 by the player in possession of the personal electronic device 202.

Alternatively, if a match is not found or if the internal server 216 does not maintain or have access to a database with information sufficient to verify the identity information supplied by the personal electronic device 202, the internal server 216 can submit a request to the external server 214 to verify the identity information supplied. The external server 214 can verify the identity of the personal electronic device 202 and/or the player in possession of the personal electronic device 202 using any suitable technique, including but not limited to: submitting a request to the personal electronic device 202 for the player to log into one or more services; submitting a request to the personal electronic device 202 for the player to verify his or her identity and/or his or her intent to access the electronic gaming machine 204; and so on.

The foregoing embodiments depicted in FIG. 2 and the various alternatives thereof and variations thereto are presented, generally, for purposes of explanation, and to facilitate an understanding of various configurations and constructions of a network architecture that facilitates communication by and between various components of a player's personal electronic device, an electronic gaming machine, and/or one or more casino servers or systems, and the various components thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
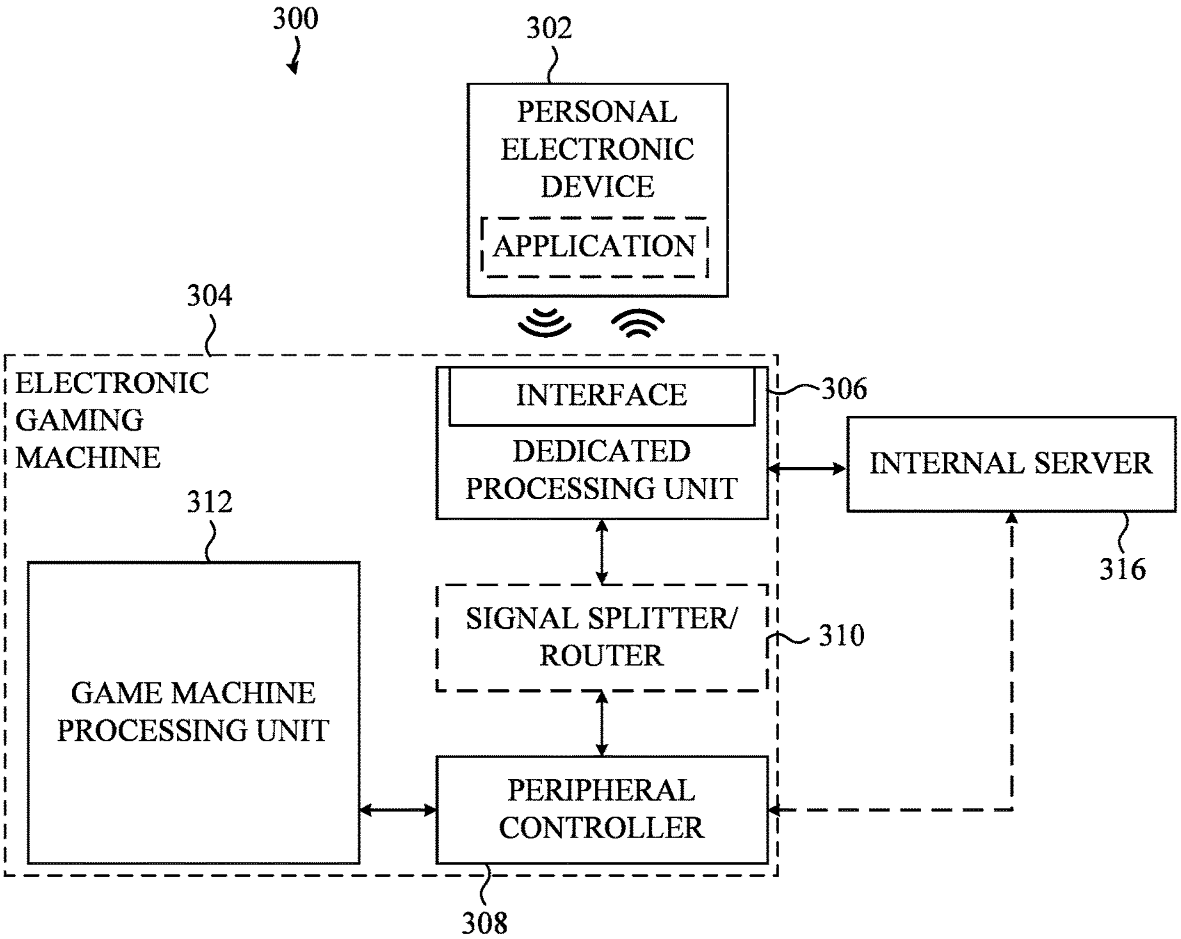
FIG. 3 is a simplified schematic representation of a casino system, such as described herein, in which a personal electronic device is configured to communicate with a dedicated processing unit in an electronic gaming machine.

For example, FIG. 3 depicts a casino system similar to the system described in reference to FIG. 2. For simplicity of description and illustration, it may be understood that the various elements described in reference to the system 200 depicted in FIG. 2 are similarly numbered in the embodiment depicted in FIG. 3; the description of these various elements is not repeated here. The system 300 includes a personal electronic device 302, an electronic gaming machine 304, a dedicating processing unit 306, a peripheral controller 308, an optional signal splitter/router 310, a game machine processing unit 312, and an internal server 316. In this embodiment, contrasted with FIG. 2, an external server may not be required.

In this example, the personal electronic device 302 can be configured to supply identity and/or identifying information to the electronic gaming machine 304 without requiring input from an external server. In this example, information supplied by the personal electronic device 302—and/or information derived from information supplied by the personal electronic device 302—can be conveyed, either directly or indirectly to the internal server 316. The internal server 316 can compare the information supplied by the dedicated processing unit 306 to information stored in one or more databases (e.g., player databases, player tracking databases, player account databases, and so on) and, if a match is obtained, the internal server 316 may send a signal back to one or more components of the electronic gaming machine 304 authorizing access to (e.g., gameplay) the electronic gaming machine 304 by the player in possession of the personal electronic device 302.

Figure 4:
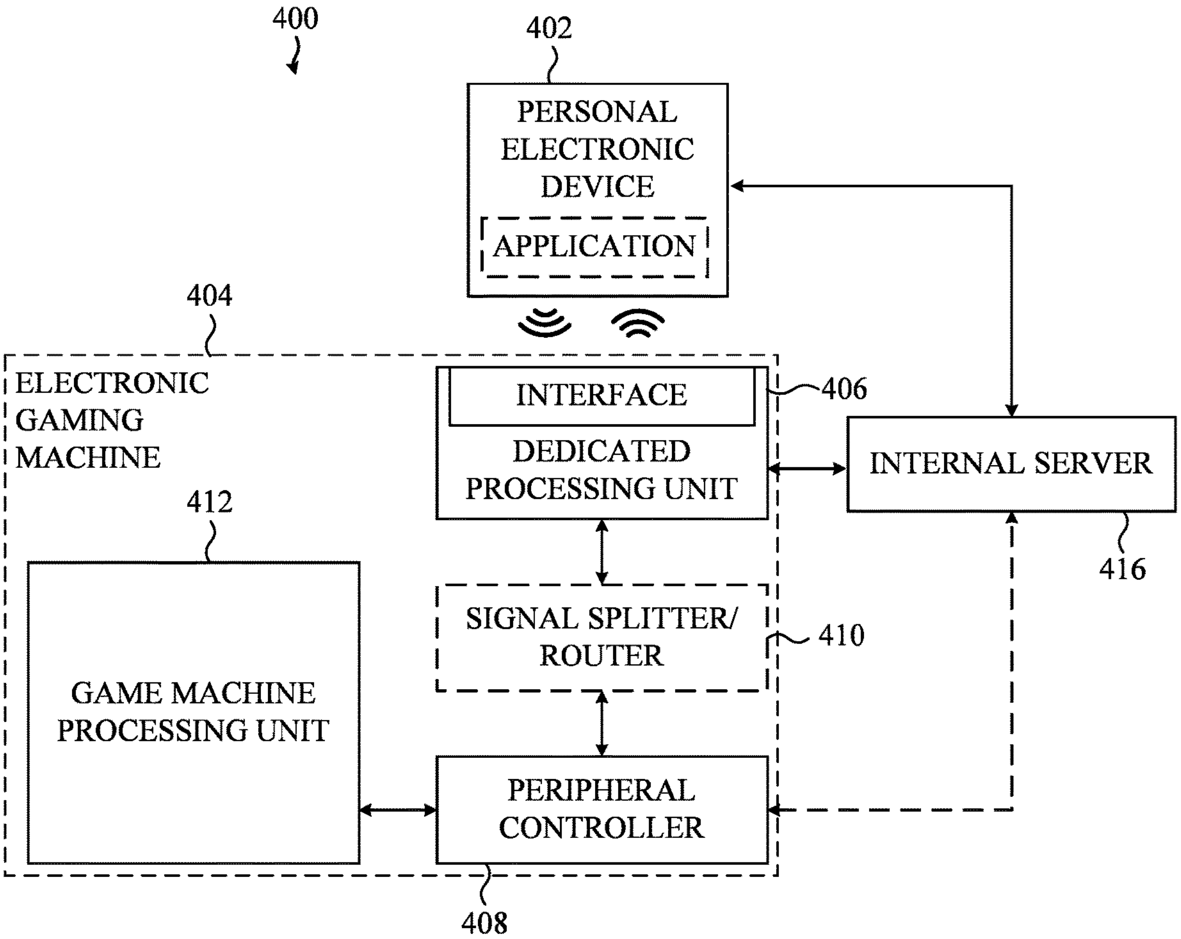
FIG. 4 is a simplified schematic representation of a casino system, such as described herein, in which a personal electronic device is configured to communicate with a server internal to a casino network.

In another example, FIG. 4 depicts a casino system similar to the system described in reference to FIG. 3. For simplicity of description and illustration, it may be understood that the various elements described in reference to the system 300 depicted in FIG. 3 are similarly numbered in the embodiment depicted in FIG. 4; the description of these various elements is not repeated here. The system 400 includes a personal electronic device 402, an electronic gaming machine 404, a dedicating processing unit 406, a peripheral controller 408, an optional signal splitter/router 410, a game machine processing unit 412, and an internal server 416. In this embodiment, contrasted with FIG. 3, the personal electronic device 402 is configured to transact information with the internal server 416.

The personal electronic device 402 and the internal server 416 can communicate across any suitable communication link (e.g., Wi-Fi, cellular, and so on) any suitable data including, but not limited to: secure session tokens; secure and/or login cookies; identity information; balance information; and so on.

Figure 5:
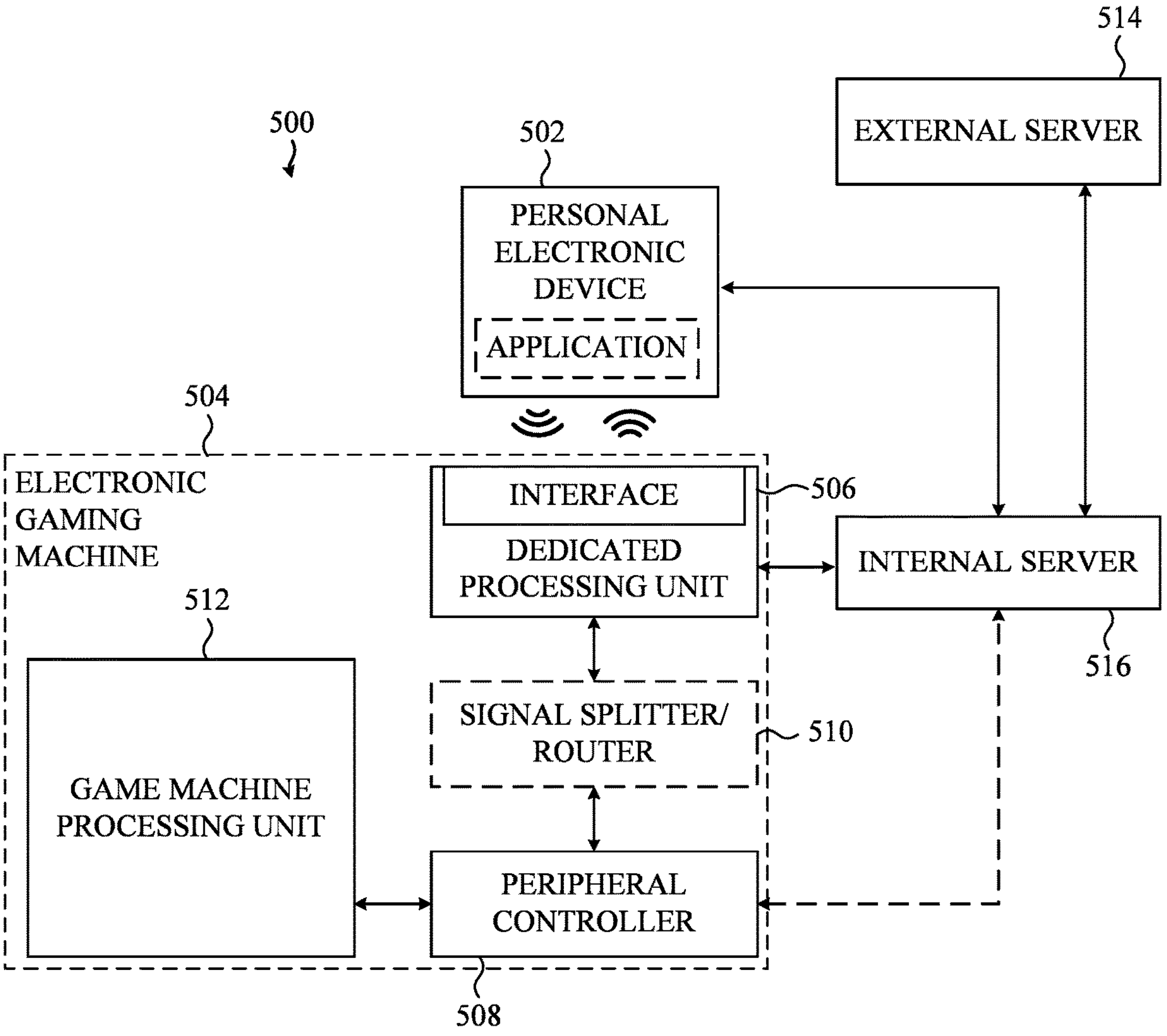
FIG. 5 is another simplified schematic representation of a casino system, such as described herein, in which a personal electronic device is configured to communicate with a server internal to a casino network.

In another example, FIG. 5 depicts a casino system similar to the system described in reference to FIG. 2. For simplicity of description and illustration, it may be understood that the various elements described in reference to the system 200 depicted in FIG. 2 are similarly numbered in the embodiment depicted in FIG. 5; the description of these various elements is not repeated here. The system 500 includes a personal electronic device 502, an electronic gaming machine 504, a dedicating processing unit 506, a peripheral controller 508, an optional signal splitter/router 510, a game machine processing unit 512, an external server 514, and an internal server 516. In this embodiment, contrasted with FIG. 4, only the internal server 516 is configured to communicate with the external server 514. As a result of this construction, the internal server 516 may be configured to query the external server 514 to verify the identification and/or identity information supplied by the personal electronic device 502. For example, the personal electronic device 502 may submit a request to fund a player account with additional funds. In this example, the internal server 516 may be configured to query a banking institution, represented by the external server 514, to verify that the player has the ability to fund the player's account to the requested amount. In other embodiments, the internal server 516 can communicate with the external server 514 for any other suitable purpose.

The foregoing embodiments depicted in FIGS. 3-5 and the various alternatives thereof and variations thereto are presented, generally, for purposes of explanation, and to facilitate an understanding of various configurations and constructions of a network architecture that facilitates communication by and between various components of a player's personal electronic device, an electronic gaming machine, and/or one or more casino servers or systems, and the various components thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that any of the communicably coupled devices described herein can exchange or transact any suitable data, at any suitable speed, across any suitable wire or wireless medium, according to any suitable protocol. The data transacted may be encrypted, compressed, or formatted according to any suitable standard. In many cases, private and/or confidential information—such as financial or banking information—is preferably encrypted from end-to-end to ensure privacy of the player is maintained.

Similarly, it may be appreciated that the various casino systems and services described herein can be implemented in a number of ways. For example, a casino accounting system can be implemented in a number of ways. Conventionally, as noted above, a casino accounting system includes at least one server and at least one database. The server records each transaction of player points in the casino environment. More specifically, the accounting system server may be configured to record transaction information such as, but not limited to: a player name; a timestamp; a player balance; an electronic gaming machine at which the transaction was completed; and so on.

The following embodiments reference a distributed network architecture implementing a casino accounting system that can be used with any embodiment described herein. More specifically, the embodiments that follow reference a casino accounting system in which each transaction is cryptographically signed and added to a shared and/or distributed ledger. As a result of this construction, transaction records in a casino can be stored in a redundant, robust, and distributed manner.

Figure 6:
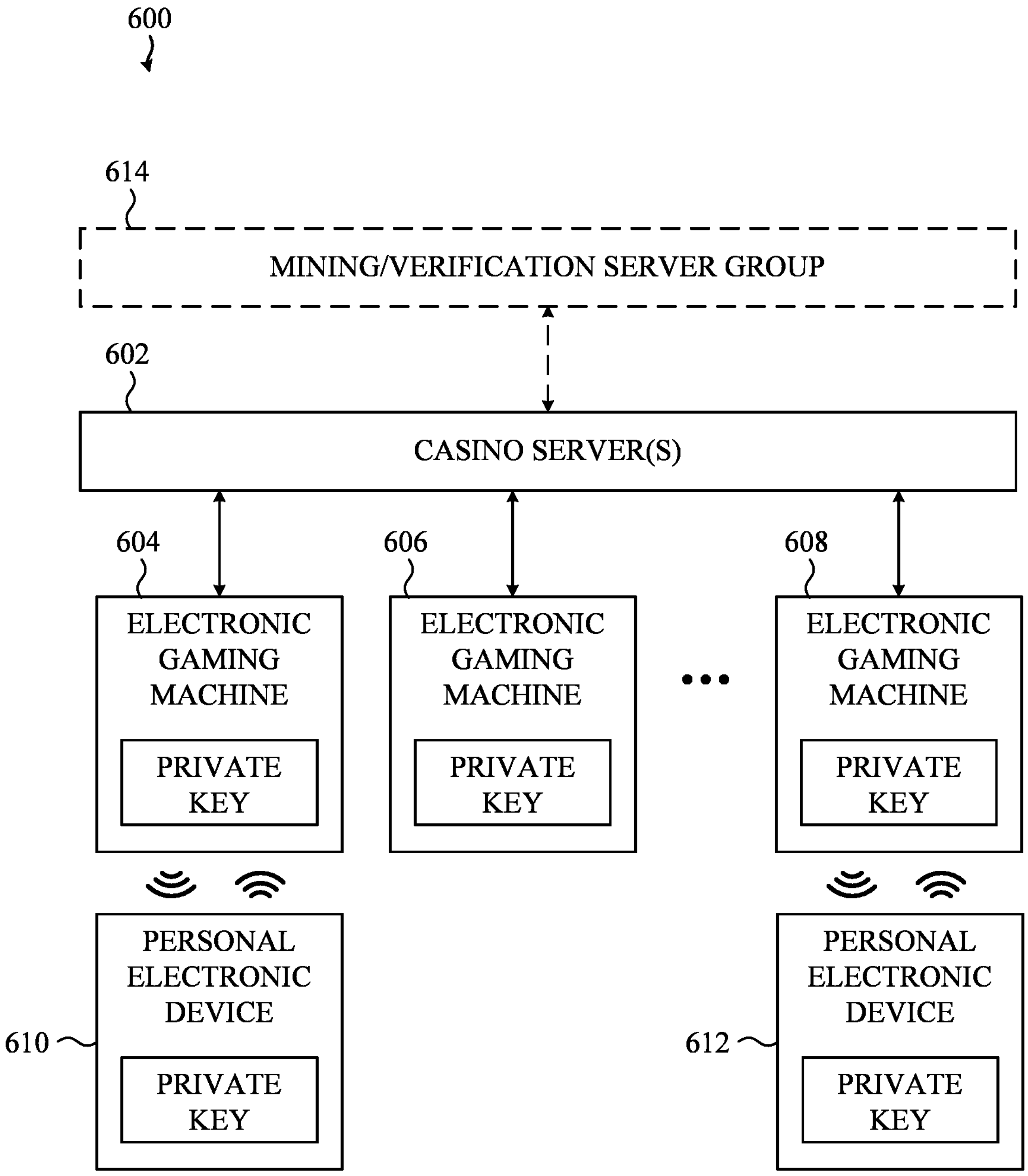
FIG. 6 is a schematic representation of a casino system configured to record transactions in the casino on a blockchain.

For example, FIG. 6 depicts a casino network, identified as the system 600, that is configured to store transactions and transaction details on a distributed blockchain. The system 600, as with other embodiments described herein, can include an internal network on which one or more casino servers or services operate and transact data. Collectively, these server(s) are identified as the casino servers 602.

As with other embodiments described herein, the system 600 also includes one or more electronic gaming machines. Three example electronic gaming machines are identified as the electronic gaming machine 604, the electronic gaming machine 606, and the electronic gaming machines 608.

In this embodiment, the system 600 also includes two personal electronic devices, identified as the personal electronic device 610 and the personal electronic device 612. As may be appreciated in view of the various embodiments described herein, the two personal electronic devices depicted correspond to two players interacting with two of the three depicted electronic gaming machines. In particular, a first player associated with the personal electronic device 610 is depicted as interacting with the electronic gaming machine 604, and a second player associated with the personal electronic device 612 is depicted as interacting with the electronic gaming machine 608.

As noted above, the system 600 is configured to store transaction data on a blockchain. In other words, each transaction performed in the casino environment 600 is signed by at least one cryptographic key. More particularly, transaction data—whether encrypted or otherwise—can be hashed using a private key of a public-private key combination. The resulting hash—referred to herein as a "signature"—can be appended to or otherwise associated with the transaction data. At a later time, the public key of the same public-private key pair can be used to verify that the transaction data has not changed since the original signature was generated.

For example, a transaction of points between the first player (associated with the personal electronic device 610) and the electronic gaming machine 604 can be signed by a private key associated with the first player (e.g., a private key stored on the personal electronic device 610) and/or by a private key associated with the electronic gaming machine 604. By providing a cryptographically unique signature, the player's identity can be verifiably and reliably associated with each transaction authorized by that user.

At a later time, a regulator, casino auditor, accountant, or other person or software application can re-hash the transaction data using either or both public keys of the electronic gaming machine 604 and the first player in order to verify that the transaction data has not changed since it was originally recorded. In this manner, transactions performed in the casino environment facilitated by the system 600 can be cryptographically verified; once a transaction is signed by both parties to that transaction, it may be considered computationally impossible to falsify or change that transaction at a later time. As such, generally and broadly, it may be understood that cryptographic signing of transactions in a casino environment dramatically increase the immutability—and therefore security—of a database storing those transactions.

In further embodiments, multiple signed transactions in a casino environment can be grouped together into a "block" of transactions. Typically, the transactions may be ordered based on a timestamp, but this may not be required. Once ordered in a particular manner, the multiple transactions in the block can, themselves be hashed according to a selected hashing algorithm. In many embodiments, transactions are hashed in pairs in order to generate a Merkel tree with a single root hash, but this may not be required. As may be appreciated, mutual hashing of blocks of transactions can have the effect of simplifying error checking and validation of prior transactions in the casino environment; verifying a hash of a root node and/or a discrete number of branches of a Merkel tree may be computationally simpler than verifying a hash of every transaction in a block.

In still further embodiments, multiple sequential blocks of transactions can be hashed together into a "chain." Similar to the grouping of transactions described above, sequential blocks can be mutually hashed; these hashes can be stored in a database such that all transactions in all blocks can be easily verified at a later time. In this manner, as more and more blocks are added to the chain, the reliability and immutability of data stored in the chain increases.

In some examples, the operations described above—and in particular, the hashing and grouping of transactions into blocks—can be performed by a central server or server group within the casino environment. This is, however, merely one example.

In some embodiments, more than one server may be tasked with performing one or more of the operations described above. For example, a group of the servers, such as the mining/verification server group 614, may be tasked, in parallel, to calculate the hashes of a block of transactions and/or signatures that have been received in a certain period of time or after a particular timestamp. As may be appreciated, this may create a race condition between the servers; different servers processing different groups of transactions in slightly different order may return entirely different hashes. This can present a problem if the data corresponding to those hashes is intended to be stored in a single database or a single blockchain.

As such, some embodiments described herein require the servers of the mining/verification server group 614 to perform computational work. This intentionally slows the process of hashing transactions into blocks and, as a result, statistically speaking only a single server will finish the computation work "first." Once one server completes the computational work, the hash calculated by that server can be added to the blockchain after other servers or devices verify that the salt hash discovered by the first server to complete the computational work. In many cases, the system 600 may require a minimum number of verifications before a block and/or a transaction is added to the blockchain. For example, six verifications may be required before a block is added to the chain.

The computational work required to be performed by the servers of the mining/verification server group 614 can vary from embodiment to embodiment. However, in one particular example, the servers of the mining/verification server group 614 are tasked with finding a hash of a block of transactions (herein, a "target hash") that is required to include a particular string of alphanumeric numbers. For example, in one embodiment, a target hash may be required to have a least significant character of "0." In other cases, a target hash may be required to have the most significant characters equal to "000." In other embodiments, any arbitrary string of characters may be required. In still other embodiments, other arbitrary criteria can be required of the target hash. Example requirements of the target hash can include, without limitation: a particular string of digits; a total count of a particular digit; a total count of pairs of digits; equal first and last characters; including exactly none of a particular digit or character; and so on.

In order to change the target hash, the servers of the mining/verification server group 614 may generate random hashes (referred herein as "salt" hashes) to hash with a particular block of transactions. As may be appreciated, as single bits of a salt hash change, the target hash will also entirely change. In this manner, by sequentially or randomly changing the salt hash, the target hash can be changed. Once one of servers in the mining/verification server group 614 discovers a salt hash that, when hashed with a particular group of ordered transactions, results in a target hash that meets the pre-defined criteria, the system 600 can adopt the target hash of the "winning" server in the server group as the next block in the blockchain. The process of iteratively changing a salt hash that is hashed with a block of transactions in order to obtain a target hash having a property that matches a pre-defined criteria is referred to herein as "mining" or, more generally, performing "computational work."

It may be appreciated that different target hash requirements may be associated with different difficulties of computational work and the more difficult the computational work, the longer it may take for any server in the mining/verification server group 614 to find a solution. As such, for embodiments described herein, a particular casino and/or casino system may periodically vary the difficulty of computational work required of the mining/verification server group 614.

In still further embodiments, separate servers may not be required. For example, as illustrated, in some embodiments, the mining/verification server group 614 may be optional. In these embodiments, one or more components within each individual electronic gaming machine may be tasked with performing the computational work necessary to maintain the blockchain of transactions performed in the casino. For example, in one embodiment, each electronic gaming machine on a casino floor can include a dedicated blockchain processor unit that is tasked with performing the computational work described herein. In other cases, only a certain number of electronic gaming machines on a casino floor can include a dedicated blockchain processor unit tasked with performing the computational work described herein.

In still further embodiments, the computational work described herein may be performed by a processor or more than one processor in an existing component or peripheral in an electronic gaming machine. For example, and without limitation, such components can include: a processor within a bill validator; a processor within a ticket in/ticket out peripheral; a processor within a dedicated processing unit such as described herein; a processor within a peripheral controller; a processor within a game machine processing unit; a graphics processing unit in an electronic gaming machine; and so on.

In some cases, different processors in different components of a single electronic gaming machine can cooperate or otherwise pool processing power in order to perform required computational work faster. For example, in one embodiment, different sets of salt hashes can be assigned to different processors within an electronic gaming machine. In this manner, a single electronic gaming machine can process numerous salt hashes in parallel, despite that the individual processors of each of these components may not, individually, be high-power or high-frequency processors traditionally suited for cryptographic processing tasks.

In yet further embodiments, a personal electronic device of a player—such as described above—can participate in performing computational work such as described above. In these embodiments, a dedicated processing unit such as described herein can assign a task or series of tasks (e.g., performing operations to verify whether a certain group of salt hashes with a particular block of transactions results in a target hash that meets the pre-defined criteria) to a personal electronic device with which the dedicated processing unit is communicating.

In some embodiments, a relatively small computational task may be offloaded to a personal electronic device in order to prevent the personal electronic device from expending substantial battery capacity.

In other cases, the casino system may request from a player to use that player's personal electronic device to perform computational work. In exchange for permitting the casino to use the player's personal electronic device to perform computational work, the casino system can grant points and/or credits to the player's account. For example, in one embodiment, a player with a smart phone sits at an electronic gaming machine such as described herein. Once identifying information is exchanged between the smart phone and the electronic gaming machine using a technique such as described herein, the player may be presented with an option to use the player's smart phone's computational power to perform computational work. If the player agrees, the player's account may be credited with a certain amount of credit or, alternatively, a promotion or coupon may be assigned or credited to the player.

In some embodiments, as noted above, the difficulty of computational work may vary from embodiment to embodiment. As such, in some cases, a casino system (referred to herein as a "work coordination server") may dynamically, and in real-time, assign and/or distribute computational work, or portions of computational work, to processors, devices, components, or personal electronic devices based on a number of transactions being processed in a casino at a particular time.

Figure 7:
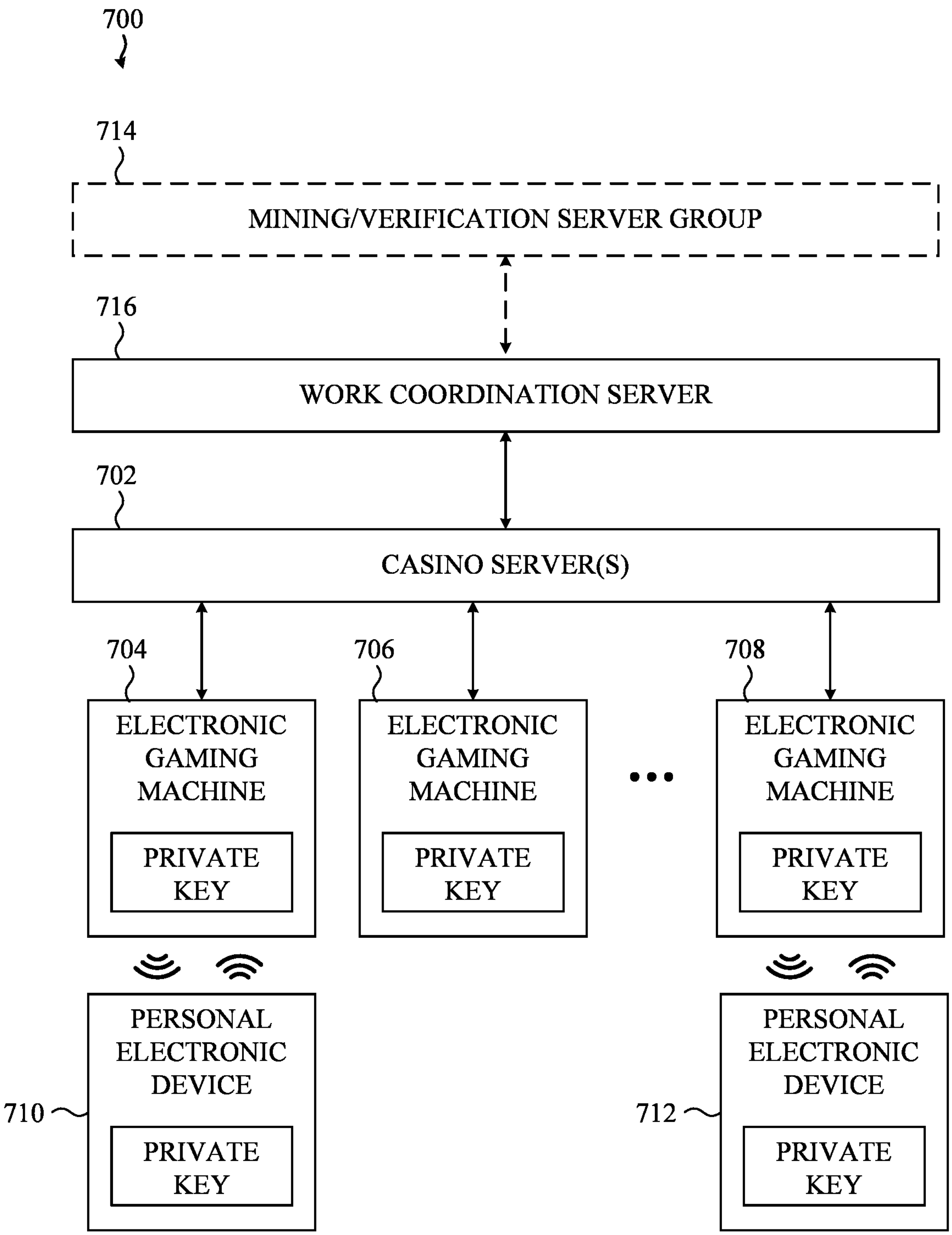
FIG. 7 is a schematic representation of another casino system configured to record transactions in the casino on a blockchain and, in particular, a system including a work coordination server configured to assign computational work tasks.

FIG. 7 depicts a casino system similar to the system described in reference to FIG. 6. For simplicity of description and illustration, it may be understood that the various elements described in reference to the system 600 depicted in FIG. 6 are similarly numbered in the embodiment depicted in FIG. 7; the description of these various elements is not repeated here. The system 700 includes one or more casino servers (identified as the casino servers 702), one or more electronic gaming machines (e.g., the electronic gaming machines 704, 706, 708), one or more personal electronic devices (e.g., the personal electronic devices 710, 712), and optionally one or more mining or verification servers 714.

The system 700 also includes a work coordination server 716. As noted above, the work coordination server 716 may dynamically, and in real-time, assign and/or distribute computational work, or portions of computational work to processors, devices, components, or personal electronic devices based on a number of transactions being processed in a casino at a particular time. For example, during off-hours in which the casino is not processing a high number of transactions, the work coordination server 716 may not request any personal electronic device of any player perform computational work, such as described above. Alternatively, during high-demand hours in which the casino is processing a high number of transactions, the work coordination server 716 may increase incentives to individual players to authorize the user of the computing power of the player's personal electronic devices.

In other embodiments, the work coordination server 716 can additionally or alternatively perform other operations such as, but not limited to: assigning electronic gaming machines not engaged by a player to perform computational work; assigning components of an electronic gaming machine not in use to perform computation work; assigning internal casino servers to perform computational work; assigning external servers to perform computational work; and so on.

It may be appreciated that a work coordination server, such as the work coordination server 716, can be suitably configured to dynamically load-balance computational work between any number of suitable processors or devices in a casino environment.

The foregoing embodiments depicted in FIGS. 6-7 and the various alternatives thereof and variations thereto are presented, generally, for purposes of explanation, and to facilitate an understanding of various configurations and constructions of a blockchain network architecture that facilitates secure recording of all transactions in a casino environment, and the various components or operations thereof, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 8:
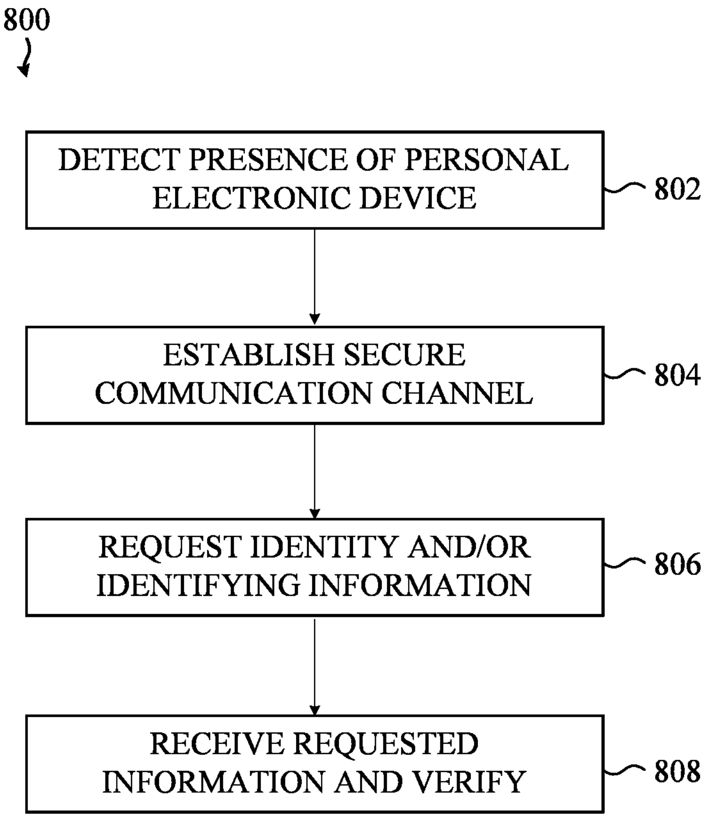
FIG. 8 is a flow chart that depicts example operations of a method of identifying a player account using a personal electronic device, such as described herein.
Figure 9:
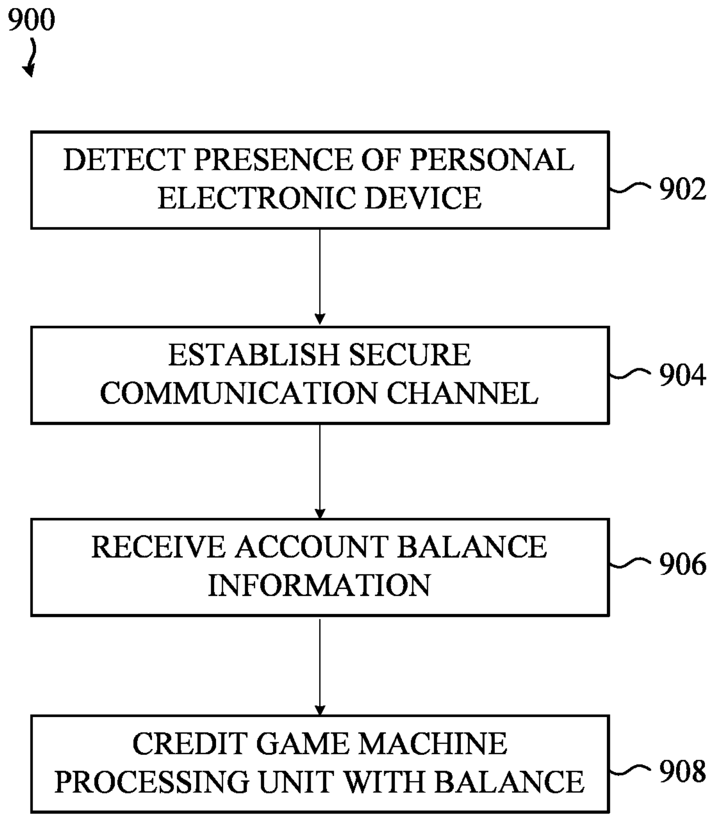
FIG. 9 is a flow chart that depicts example operations of a method of identifying a player account using a personal electronic device, such as described herein.

Generally and broadly, FIGS. 8-9 depict flow charts that correspond to methods of identifying a player, and/or crediting an electronic game machine from a player account using a personal electronic device, such as described herein.

For example, FIG. 8 is a flow chart that depicts example operations of a method of identifying a player using a personal electronic device, such as described herein. The method 800 includes operation 802 in which a mobile interface device communicably coupled to a dedicated processing unit (see, e.g., FIGS. 1A-5) detects the presence of a personal electronic device using a method or technique such as described herein. At operation 804, a secure communication channel is established between the mobile interface device and the personal electronic device. At operation 806, the dedicated processing unit requests identity and/or identifying information from the personal electronic device. Thereafter, at operation 808, the requested information can be received and verified by the dedicated processing unit. For example, the dedicated processing unit can submit a query including the received information to an internal or external server such as described above.

FIG. 9 is a flow chart that depicts example operations of a method of identifying a player account using a personal electronic device, such as described herein. The method 900 includes operation 902 in which a mobile interface device communicably coupled to a dedicated processing unit (see, e.g., FIGS. 1-5) detects the presence of a personal electronic device using a method or technique such as described here. At operation 904, a secure communication channel is established between the mobile interface device and the personal electronic device. At operation 906, account balance information is received from the personal electronic device. The account balance information may be accompanied by an account number or other identifier, although this is not required. Thereafter, at operation 908, a game machine processing unit is credited with the account balance associated with the account.

In these examples, the account balance information can be transmitted to the dedicated processing unit with a cryptographic signature that verifies the account balance information is genuine and up-to-date. For example, in a prior operation, the personal electronic device can communicate with an internal or external server to request a verified account balance. In response the internal or external server transmits an account balance and a cryptographic signature (or, in other embodiments, an encrypted account balance that is not readable or modifiable by the personal electronic device) that can be transmitted and read by the dedicated processing unit.

Figure 10:
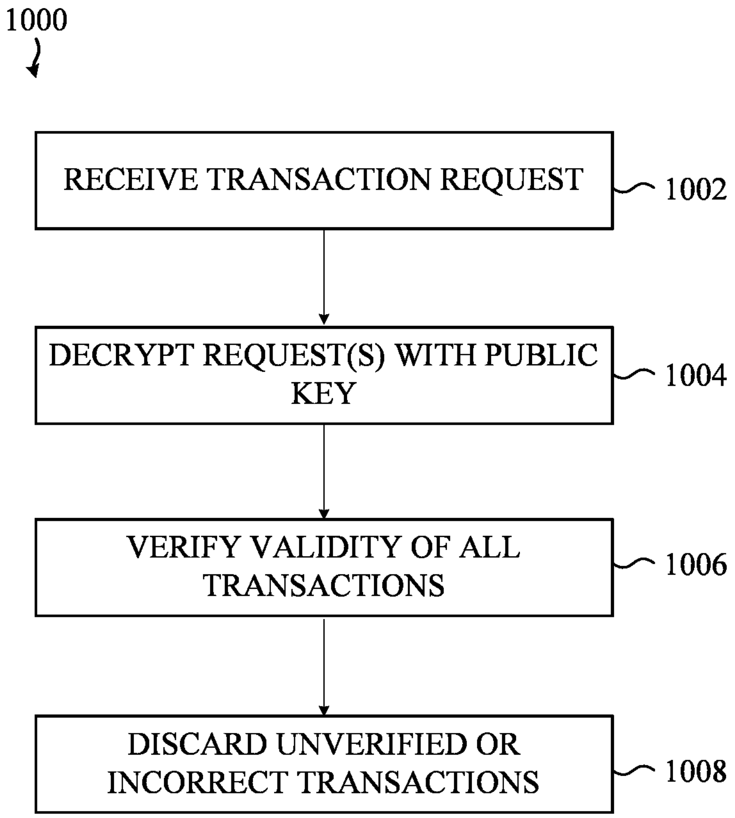
FIG. 10 is a flow chart that depicts example operations of a method of receiving and verifying transactions in a casino blockchain environment.
Figure 11:
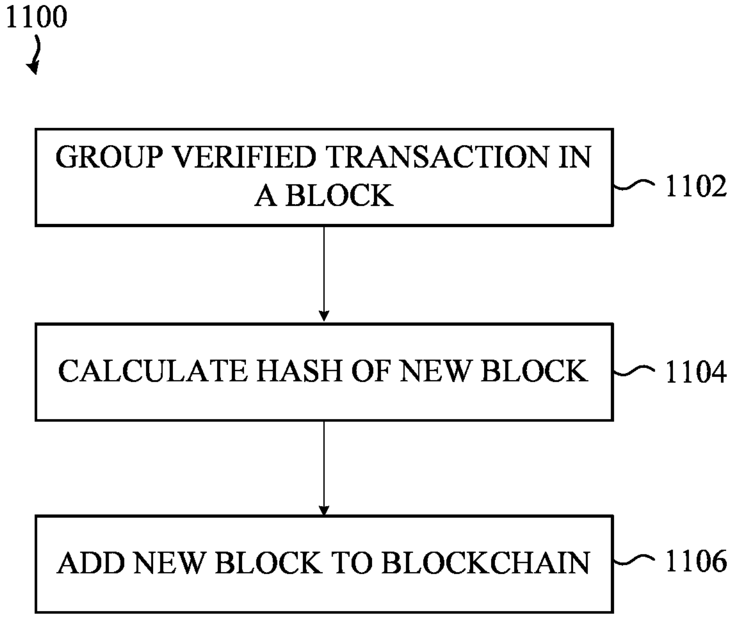
FIG. 11 is a flow chart that depicts example operations of a method of grouping verified transactions into a block in a casino blockchain environment.
Figure 12:
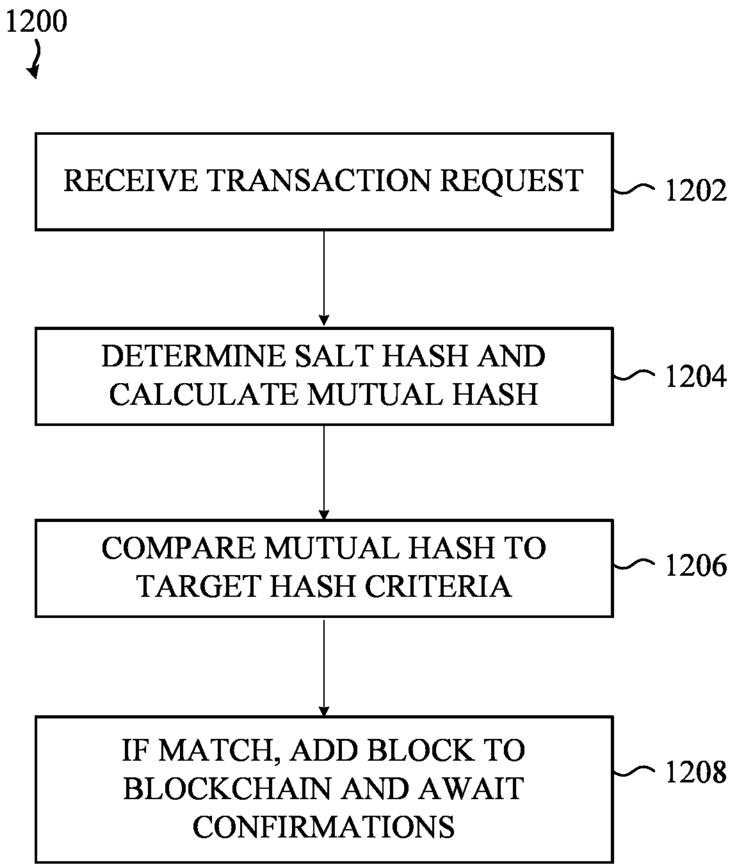
FIG. 12 is a flow chart that depicts example operations of another method of grouping verified transactions into a block in a casino blockchain environment.

Generally and broadly, FIGS. 10-12 depict flow charts that correspond to methods of verifying and storing transactions on a blockchain, such as described herein.

FIG. 10 depicts example operations of a method of receiving and verifying transactions in a casino blockchain environment. The method 1000 includes operation 1002 in which a transaction request is received at a server, such as a mining/verification server described above. In other cases, the transaction request is received at a processor assigned by a work coordination server to perform a task.

Once the transaction request is received, operation 1004 processes to decrypt all outstanding or unrecorded transactions, including the transaction request received at operation 1002. As explained above, the transactions can be decrypted using a public key.

Next, at operation 1006, the hashes of the decrypted transactions can be verified by comparing the hashes to public keys associated with the transaction (e.g., a particular electronic gaming machine, a particular player or electronic device, and so on). Finally, at operation 1006, transactions that cannot be verified are discarded.

FIG. 11 depicts example operations of a method of grouping verified transactions into a block in a casino blockchain environment. The method 1100 begins at operation 1102 in which a set—of fixed or arbitrary size—of already-verified transactions are selected. In some cases, all pending transactions may be included, but this may not be required and some transactions may be omitted or passed over. Next at operation 1104 the hash of the block constructed at operation 1102 is calculated. Next, at operation 1106, the new block—and its hash—are added to the blockchain by hashing the new block with the existing blockchain.

FIG. 12 depicts example operations of another method of grouping verified transactions into a block in a casino blockchain environment. The method 1200 begins at operation 1202 in which a set—of fixed or arbitrary size—of already-verified transactions are selected. In some cases, all pending transactions may be included, but this may not be required and some transactions may be omitted or passed over. Next, at operation 1204 a salt hash is determined and hashed with the block constructed at operation 1202 to create a mutual hash. Next, at operation 1206, the mutual hash is compared to a target hash criteria. If the mutual hash matches the target hash criteria, then the block is added to the blockchain. Optionally, the method can continue at operation 1208 by waiting for a certain selected number of confirmations (i.e., other servers producing the same hash values).

Figure 13:
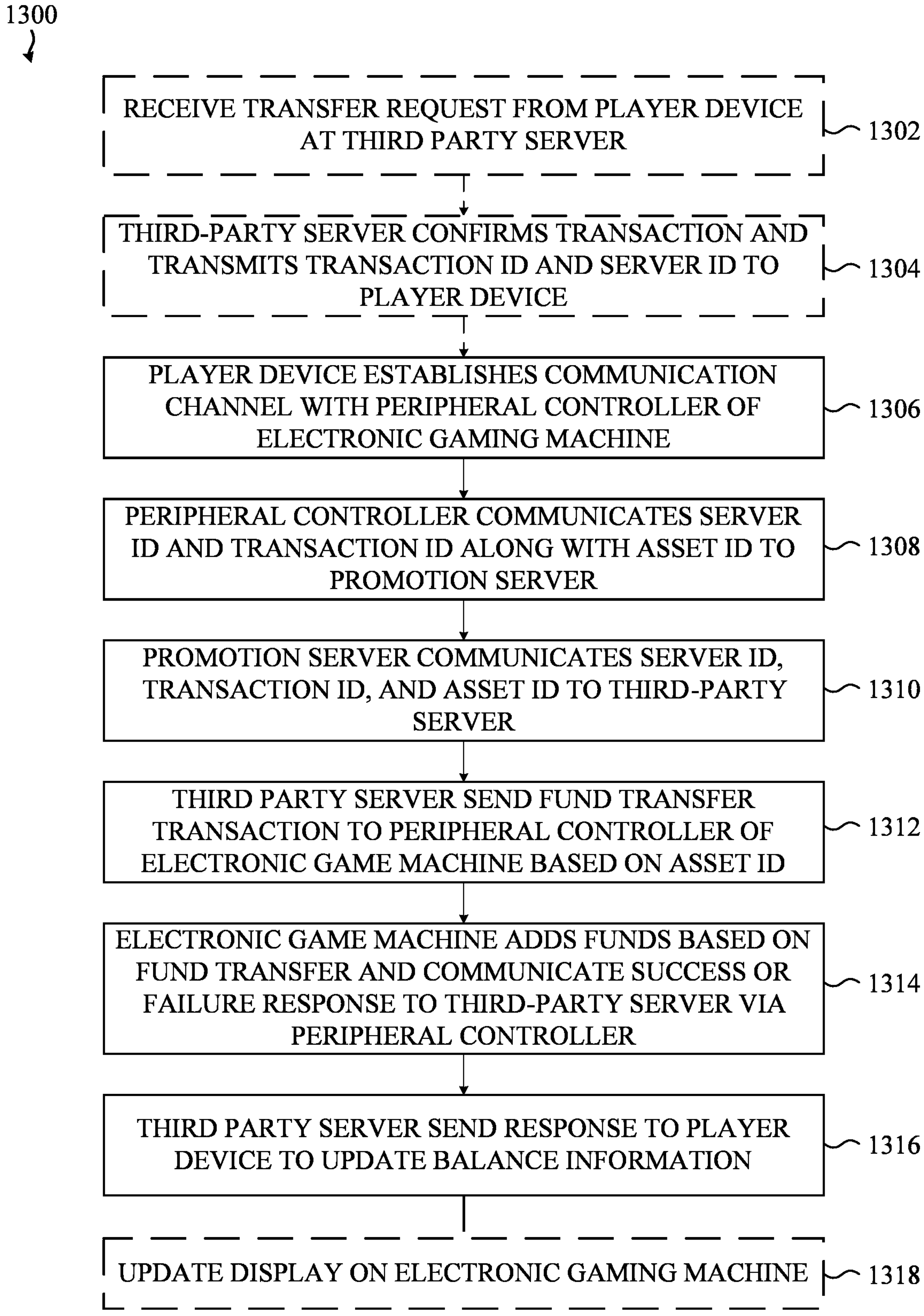
FIG. 13 is a flow chart that depicts example operations of a method of identifying a player and an electronic gaming machine using a personal electronic device, such as described herein.

FIG. 13 depicts example operations of a method of transferring funds in a casino environment, such as described herein. The method 1300 beings at operation 1302 in which a personal electronic device, such as described herein, receives an instruction from a player to initiate a money transfer from an account associated with the player (e.g., bank account, player account, and so on) to an electronic gaming machine, such as described herein. Typically, and in the example the follows, the account is controlled by or otherwise accessible to a third-party server, such as a banking server or account management server. In some examples, such as in the illustrated embodiment, this operation may be optional.

In response to the request from the personal electronic device at operation 1302, the third-party server at operation 1304 server confirms the transaction request and creates a unique transaction identifier (or code) that is associated with the requested transaction. The third-party server thereafter bundles the transaction identifier with a server identifier (or code) that is associated with the third-party server in a message that is returned to the personal electronic device, preferably across an encrypted data channel. In some examples, such as in the illustrated embodiment, this operation may be optional.

In response to the message received from the third-party server by the personal electronic device at operation 1304, the personal electronic device can perform an action to initiate secure local communication with an electronic gaming machine with which the player desires to interact at operation 1306. Any suitable method of initiating secure local communication can be used, including methods described herein relating to Bluetooth communication, near-field communication, Wi-Fi communication, and so on. For simplicity of description, the present embodiment is described in reference to near-field communications, but it may be appreciated that this is merely one example and that other embodiments can be implemented in a different way.

In response to the personal electronic device initiating secure local communication with a selected electronic gaming machine at operation 1306 (e.g., via the player tapping the personal electronic device onto a passive or active near-field communication tag disposed on or within the gaming cabinet associated with an electronic gaming machine), a peripheral controller within the selected electronic gaming machine can request and/or receive the server identifier and the transaction identifier communicated to the personal electronic device from the third-party server. Thereafter, the peripheral controller can communicate the transaction identifier and server identifier, along with an asset identifier (or code) associated with the peripheral controller and/or electronic gaming machine, to a promotion server, such as described herein, at operation 1308. In this manner, the promotion server is informed of the identity of the electronic gaming machine with which the player desires to interact.

Thereafter, at operation 1310, the promotion server can forward the transaction identifier, the server identifier, and the asset identifier back to the third-party server for verification. If the third-party server verifies the information received from the promotion server, the third-party server can, at operation 1312, send a fund transfer transaction request to the peripheral controller of the selected electronic gaming machine. In response, at operation 1314, the electronic gaming machine can add funds based on the funds transfer request. Thereafter, the electronic gaming machine and/or the peripheral controller of the electronic gaming machine can report to one or more casino systems and/or to one or more other servers (e.g., the third-party server) that the transaction completed successfully or, alternatively, that an error was encountered and the transaction failed.

Next, at operation 1316, the third-party server can (optionally) send an instruction to the personal electronic device of the player to update a balance stored within the personal electronic device. Finally, at optional operation 1318, a display of the electronic gaming machine can be updated to indicate either success or failure of the requested transaction.

The foregoing embodiments depicted in the figures referenced above and the various alternatives thereof and variations thereto are presented, generally, for purposes of explanation, and to facilitate an understanding of various configurations and constructions of a network architecture that facilitates communication by and between various components of a player's personal electronic device, an electronic gaming machine, and/or one or more casino servers or systems, and the various components thereof, such as described herein. More simply, these embodiments describe systems and methods for associating a player account with a particular electronic gaming machine so that a player can rapidly and easily begin interacting with an electronic gaming machine once that player arrives at that gaming machine. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, and as noted above, generally and broadly, it is understood that various embodiments described herein reference systems for associating, linking, or otherwise logically or legally connecting a player account to an electronic gaming machine. A number of suitable techniques and network architectures that facilitate such an operation are described above and in reference to FIGS. 14A-14E.

Figure 14A:
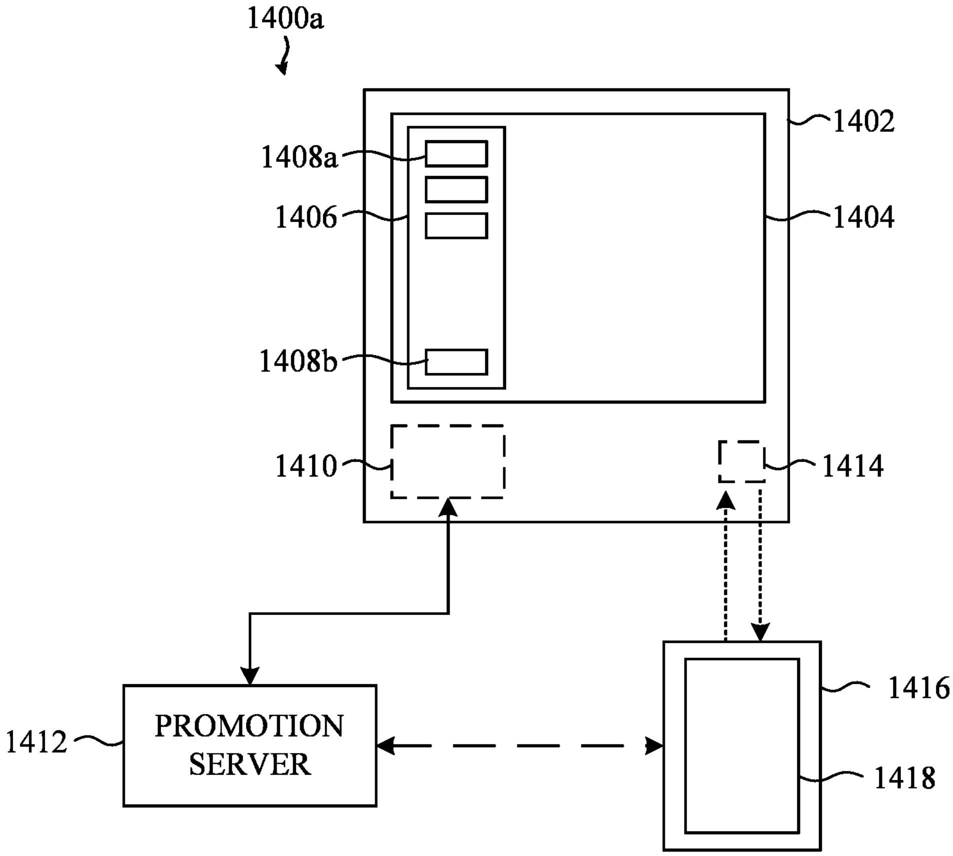
FIG. 14A is a simplified diagram of a system for associating a player account and an electronic gaming machine, such as described herein.

For example, FIG. 14A depicts a system such as described herein. The system 1400*a* includes an electronic game machine 1402 that, among other components discussed in reference to other embodiments described herein, can include a display 1404. In some embodiments the display 1404 is configured to render a graphical user interface that presents an electronic casino game (or service) to a player, such as, but not limited to: poker; blackjack; keno; bingo; sports betting; pari-mutuel betting; lottery; slot machine games; matching games; multi-player role play games; and so on.

In some embodiments, a supplemental graphical user interface (also referred to as a "secondary display") can also be shown on the display 1404. In the illustrated embodiment, the supplemental graphical user interface is identified as the supplemental graphical user interface 1406. The supplemental graphical user interface 1406 is depicted as an overlay, only occupying a portion of the display 1404, but it is appreciated that this is merely one configuration; other examples can be implemented in other ways.

In some embodiments, the supplemental graphical user interface 1406 can provide additional options and/or features to a player of the electronic game machine 1402. Example features can include, but are not limited to: beverage service ordering; hotel service ordering; player account balance information; player account management; player account funding operations; third-party service (e.g., online services, social media services) integrations; and so on. In some examples, the supplemental graphical user interface 1406 can provide different buttons, such as the buttons 1408*a*, 1408*b*, that can each be associated with different functions of the supplemental graphical user interface 1406. For example, in one embodiment, the button 1408*a* is associated with a player account balance inquiry function and the button 1408*b* is associated with a player logout or account disassociation function, such as described in greater detail below.

As with other embodiments described herein, the electronic game machine 1402 can also include a peripheral controller 1410 that is networked to, or otherwise in communication with, an external server such as the promotion server 1412. The peripheral controller 1410 and the promotion server 1412 can be configured in the same manner as other embodiments described herein. In other cases, the element 1410 depicted in FIG. 14A can be another component of the electronic game machine 1402 that is communicably coupled to the external server (such as the promotion server 1412). Examples alternative elements of an electronic game machine that can be communicably coupled to an external server include, but are not limited to: a ticket-in/ticket out controller; a bill validator; a game machine processing unit; a display controller; a mobile communications module; and so on. For simplicity of description, the embodiments that follow reference a peripheral controller (identified in the figure as the peripheral controller 1410) in communication with an external server (identified in the figure as the promotion server 1412), but it may be appreciated that this is merely one example and that other embodiments can be implemented in other ways.

As with other embodiments described herein, the electronic game machine 1402 can also include a mobile communications module 1414 that can be configured in the same manner and/or with the same hardware as other embodiments described herein.

The mobile communications module 1414 is configured to exchange information with a personal electronic device 1416. In the illustrated embodiment, the mobile communications module 1414 and the personal electronic device 1416 can be configured for two-way and/or multi-channel communication. For example, as noted with respect to other embodiments described herein, the mobile communications module 1414 can be configured with near-field communications and Bluetooth communications capability. In this example, the mobile communications module 1414 can receive, via either active or passive near-field communications, an identifier (and/or other data or information) from the personal electronic device 1416. Thereafter, and in some cases based on the identifier, the mobile communications module 1414 and the personal electronic device 1416 can communicably couple to one another via Bluetooth communications, after which information can be exchanged securely. As with other embodiments described herein, information exchanged between the personal electronic device 1416 and the mobile communications module 1414 is typically associated with a player account and/or a player's identity, however, these are merely examples and other information can be exchanged in other embodiments. Examples include, but are not limited to: a player name; a player account balance; a third-party account; a third-party account balance; a player preference (e.g., food or beverage preferences, game settings preferences, cashout preferences, funding source preferences, and so on); a player history (e.g., gameplay history, casino history, third-party activity history, social media history, and so on); a social media account; a telephone number; and so on.

In some embodiments, the personal electronic device 1416 is also in communication with the promotion server 1412. In these embodiments, the personal electronic device 1416 can obtain information from the mobile communications module 1414 that, in turn, can be passed to the promotion server 1412. For example, the mobile communications module 1414 can communicate an identifier to the personal electronic device 1416 that identifies the electronic game machine 1402. Thereafter, the personal electronic device 1416 can communicate the identifier to the promotion server 1412. After receiving the identifier from the personal electronic device 1416, the promotion server 1412 can establish a logical connection between the personal electronic device 1416 (and/or a player account associated with the personal electronic device 1416) with the electronic game machine 1402. Once a logical connection and/or other association is made between the personal electronic device 1416 and the electronic game machine 1402, the promotion server 1412 can perform a number of operations including, but not limited to: transferring funds to the electronic game machine 1402 from a player account associated with the personal electronic device 1416; updating and/or causing to be displayed the supplemental graphical user interface 1406; customizing the supplemental graphical user interface 1406 with information specific to a player associated with the personal electronic device 1416; instructing a component within the electronic game machine, such as the peripheral controller 1410, to perform a task such as, but not limited to, printing a tax or financial document from a voucher printer, printing a cashout voucher or promotional coupon from a voucher printer, printing a lottery ticket or receipt from a voucher printer, printing a transaction report from a voucher printer, displaying information on a secondary display, displaying information on a display associated with an input to the electronic game machine 1402 (e.g., button, lever, touchscreen, and so on), and so on; and so on.

In these embodiments, the personal electronic device 1416 can also include a display, such as the display 1418. In some examples, the personal electronic device 1416 may request permission and/or confirmation from a player (e.g., a user of the personal electronic device 1416) before and/or during interaction with the electronic game machine 1402. For example, in one embodiment, the personal electronic device 1416 can cause a confirmation to be rendered in a graphical user interface shown on the display 1418. The confirmation can request permission to communicate and/or exchange information (e.g., player account information) with the electronic game machine 1402.

The foregoing example embodiment is merely one example architecture of a system such as described herein. Generally and broadly, the system depicted in FIG. 14A facilitates an efficient linking and/or associating of a player account with a particular electronic gaming machine, enabling a player to interact with any selected electronic gaming machine on a casino floor only by using and carrying the player's personal electronic device; no tickets, cash, or cash equivalents are required to be carried, secured, presented and/or protected by the player.

From a player perspective, the player approaches the electronic gaming machine 1402 and taps the player's personal electronic device (the personal electronic device 1416) onto a marked or otherwise identified region of the electronic gaming machine 1402, thereby initiating—in one example—near-field communications and/or Bluetooth communications with the gaming machine.

Optionally, as described above, the personal electronic device 1416 can also communicate with a remote or local server, such as a promotion server or a third-party account server to exchange, without limitation: security tokens; login cookies; login information; and so on. Thereafter, the remote server can communicate with one or more systems of the electronic gaming machine to fund the gaming machine from the player's account, to display player-specific information to the player on a primary or secondary display, or for any other suitable purpose.

Figure 14B:
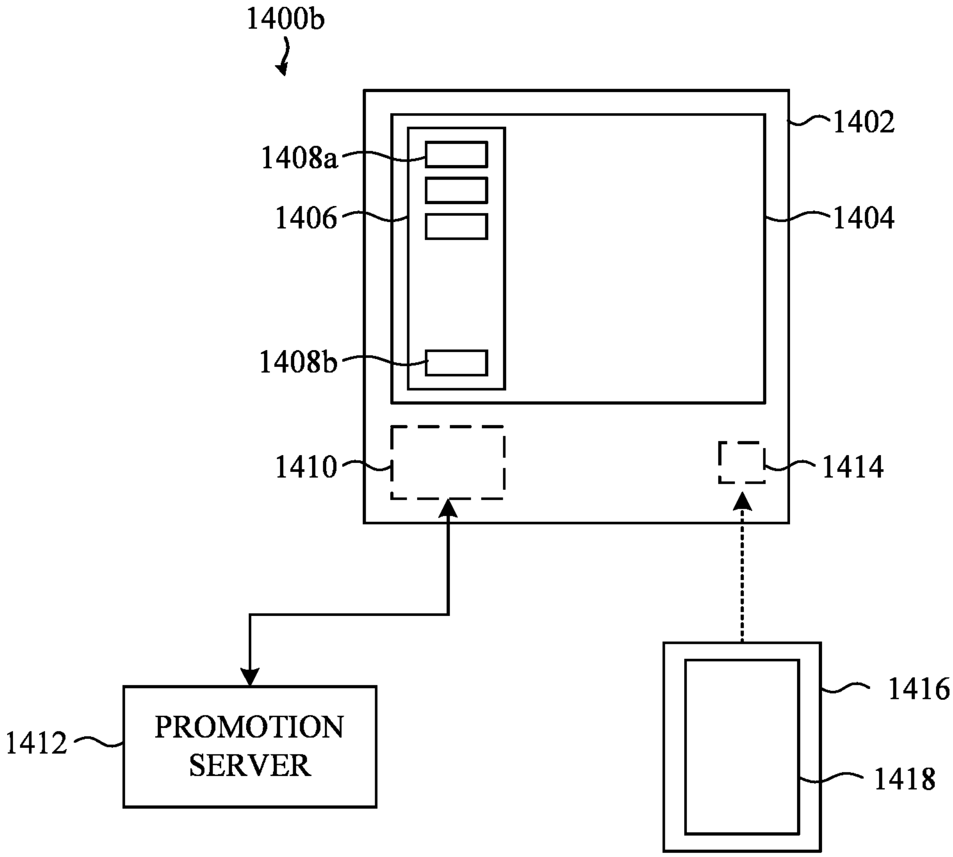
FIG. 14B is a simplified diagram of another system for associating a player account and an electronic gaming machine, such as described herein.

However, the architecture depicted and described in reference to FIG. 14A is merely one example. FIG. 14B depicts another example network architecture of a system **1400*b* such as described herein. For simplicity of description and illustration, it may be understood that the various elements described in reference to the system 1400*a* depicted in FIG. 14A are similarly numbered in the embodiment depicted in FIG. 14B; the description of these various elements is not repeated here. The system 1400*b* includes an electronic game machine 1402, an external server (identified as the promotion server 1412), and a personal electronic device 1416. Contrasted with the embodiment depicted in FIG. 14A, two-way and/or multi-channel communication between the personal electronic device 1416 and the electronic game machine 1402 (or, more specifically, the mobile communications module 1414) may not be required. In this embodiment, the personal electronic device 1416 can include a passive near-field communication tag that can be read by the mobile communications module 1414 of the electronic game machine 1402. In this manner, the electronic game machine 1402 and the external server can coordinate, based on information retrieved from the passive near-field communication tag in the personal electronic device 1416, to associate the player account associated with the owner of the personal electronic device 1416 with the electronic game machine 1402** at which the passive near-field communication tag was read.

The foregoing example embodiment is merely one example architecture of a system such as described herein. Generally and broadly, the system depicted in FIG. 14B facilitates an efficient linking and/or associating of a player account with a particular electronic gaming machine, enabling a player to interact with any selected electronic gaming machine on a casino floor only by using and carrying the player's personal electronic device. As with the embodiment depicted in FIG. 14A, no tickets, cash, or cash equivalents are required to be carried, secured, presented and/or protected by the player.

From a player perspective, the player approaches the electronic gaming machine 1402 and taps the player's personal electronic device onto a marked or otherwise identified region of the electronic gaming machine 1402, thereby initiating one-way communications with the gaming machine that serves to identify the player—and/or a player account or funding source—to the gaming machine and/or to the external server. More specifically, in this example, one or more components in the electronic game machine 1402 can communicate information received from the passive near-field communication tag in the personal electronic device 1416 with a remote or local server, such as a promotion server or a third-party account server to exchange, without limitation: security tokens; login cookies; login information; and so on. Thereafter, the remote server can communicate with one or more systems of the electronic gaming machine to fund the gaming machine from the player's account, to display player-specific information to the player on a primary or secondary display, or for any other suitable purpose.

Figure 14C:
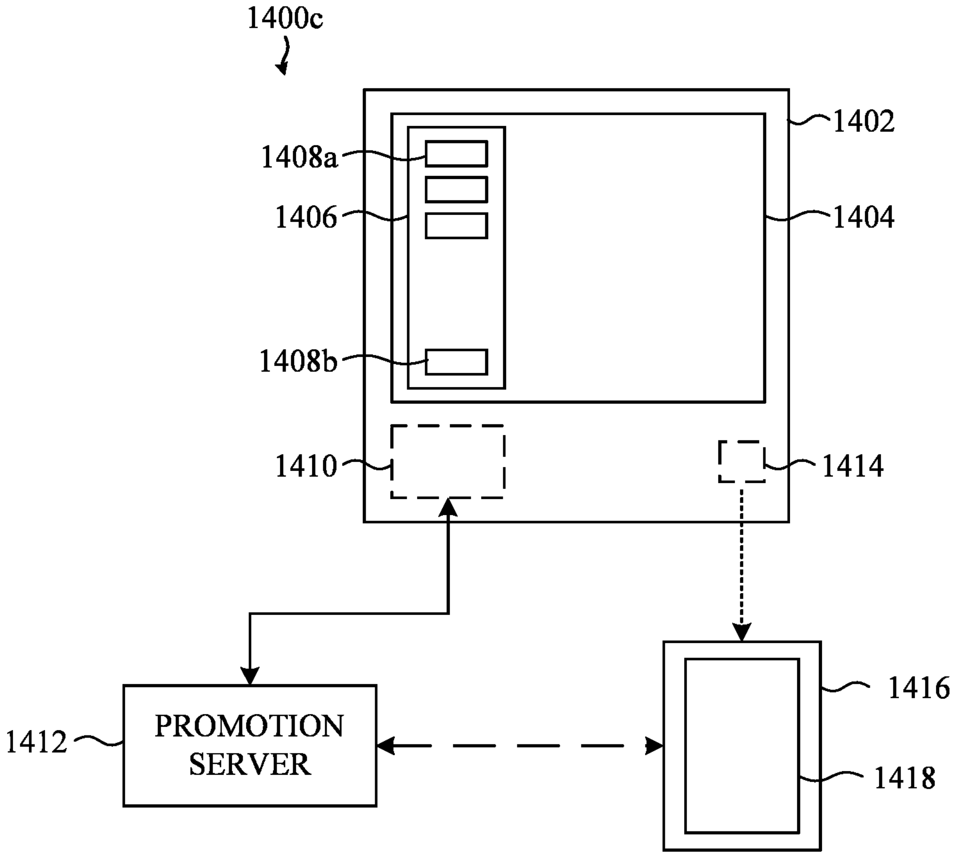
FIG. 14C is a simplified diagram of another system for associating a player account and an electronic gaming machine, such as described herein.

FIG. 14C depicts another example network architecture of a system 1400*c* such as described herein. For simplicity of description and illustration, it may be understood that the various elements described in reference to the system 1400*a* depicted in FIG. 14A are similarly numbered in the embodiment depicted in FIG. 14C; the description of these various elements is not repeated here.

The system 1400*c* includes an electronic game machine 1402, an external server (identified as the promotion server 1412), and a personal electronic device 1416. Contrasted with the embodiment depicted in FIG. 14A, two-way and/or multi-channel communication between the personal electronic device 1416 and the electronic game machine 1402 (or, more specifically, the mobile communications module 1414) may not be required. In this embodiment, the mobile communications module 1414 can include a passive near-field communication tag that can be read by the personal electronic device 1412. In this manner, the personal electronic device 1412 and the external server can coordinate, based on information retrieved from the passive near-field communication tag of the mobile communications module 1414, to associate the player account associated with the owner of the personal electronic device 1416 with the electronic game machine 1402 at which the passive near-field communication tag was read.

As described above with respect to FIGS. 14A-14B, the foregoing example embodiment is merely one example architecture of a system such as described herein. Generally and broadly, the system depicted in FIG. 14C facilitates an efficient linking and/or associating of a player account with a particular electronic gaming machine, enabling a player to interact with any selected electronic gaming machine on a casino floor only by using and carrying the player's personal electronic device. As with the embodiment depicted in FIGS. 14A-14B, no tickets, cash, or cash equivalents are required to be carried, secured, presented and/or protected by the player.

From a player perspective, the player approaches the electronic gaming machine 1402 and taps the player's personal electronic device onto a marked or otherwise identified region of the electronic gaming machine 1402, thereby initiating one-way communications from the gaming machine to the personal electronic device that serves to identify the player—and/or a player account or funding source—to the gaming machine and/or to the external server. More specifically, in this example, one or more components in the personal electronic device 1412 can communicate information received from the passive near-field communication tag in the electronic game machine (e.g., in the mobile communications module) with a remote or local server, such as a promotion server or a third-party account server to exchange, without limitation: security tokens; login cookies; login information; and so on associated with the players identity and/or the player's account. Thereafter, the remote server can communicate with one or more systems of the electronic gaming machine to fund the gaming machine from the player's account, to display player-specific information to the player on a primary or secondary display, or for any other suitable purpose.

Figure 14D:
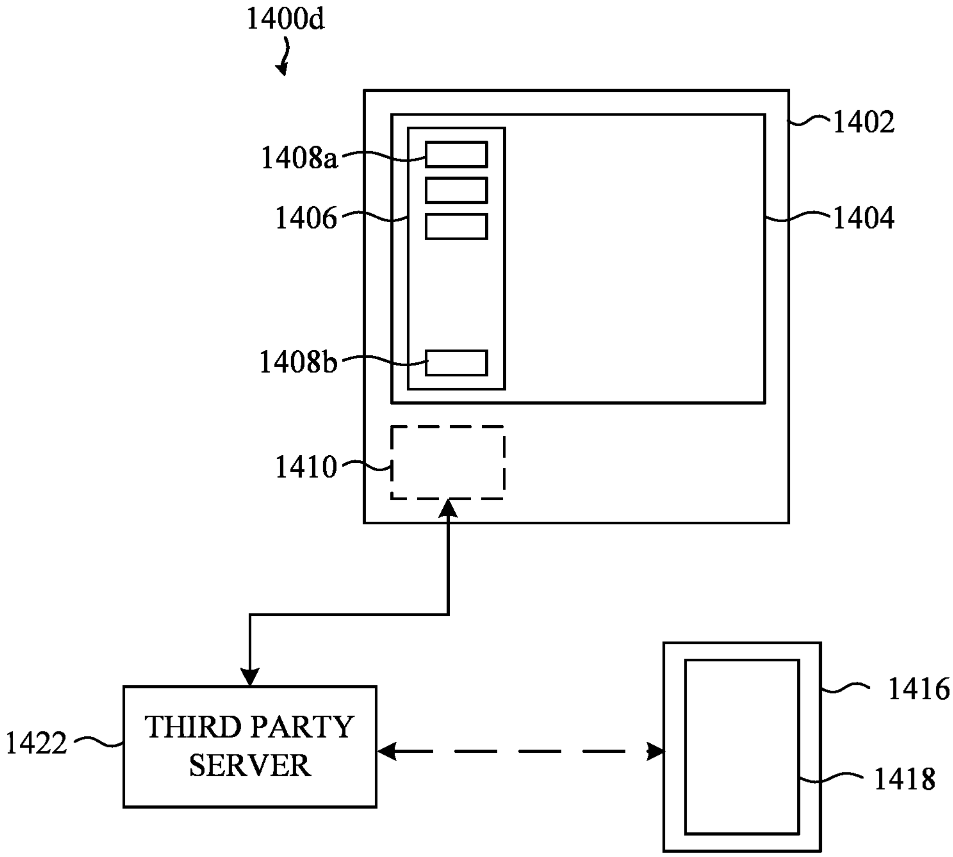
FIG. 14D is a simplified diagram of another system for associating a player account and an electronic gaming machine, such as described herein.

FIG. 14D depicts another example network architecture of a system 1400*d* such as described herein. For simplicity of description and illustration, it may be understood that the various elements described in reference to the system 1400*a* depicted in FIG. 14A are similarly numbered in the embodiment depicted in FIG. 14D; the description of these various elements is not repeated here.

The system 1400*d* includes an electronic game machine 1402, an external server (identified as the promotion server 1412), and a personal electronic device 1416. Contrasted with the embodiment depicted in FIGS. 14A-14C, communication between the personal electronic device 1416 and the electronic game machine 1402 (or, more specifically, a mobile communications module) may not be required. In this embodiment, the personal electronic device 1412 can communicate directly with the external server to associate the player account associated with the owner of the personal electronic device 1416 with an electronic game machine, such as the electronic game machine 1402, selected by the player via the personal electronic device 1412. For example, the display 1418 of the personal electronic device can render a graphical user interface that presents an option to a player to enter a code associated with, or take a photograph or video of, the electronic game machine 1402. In some examples, the personal electronic device 1416 can transmit the code, photograph, or video to the external server that, in turn, can determine an associated electronic gaming machine by comparing the code, photograph, or video to entries store in a database.

Figure 14E:
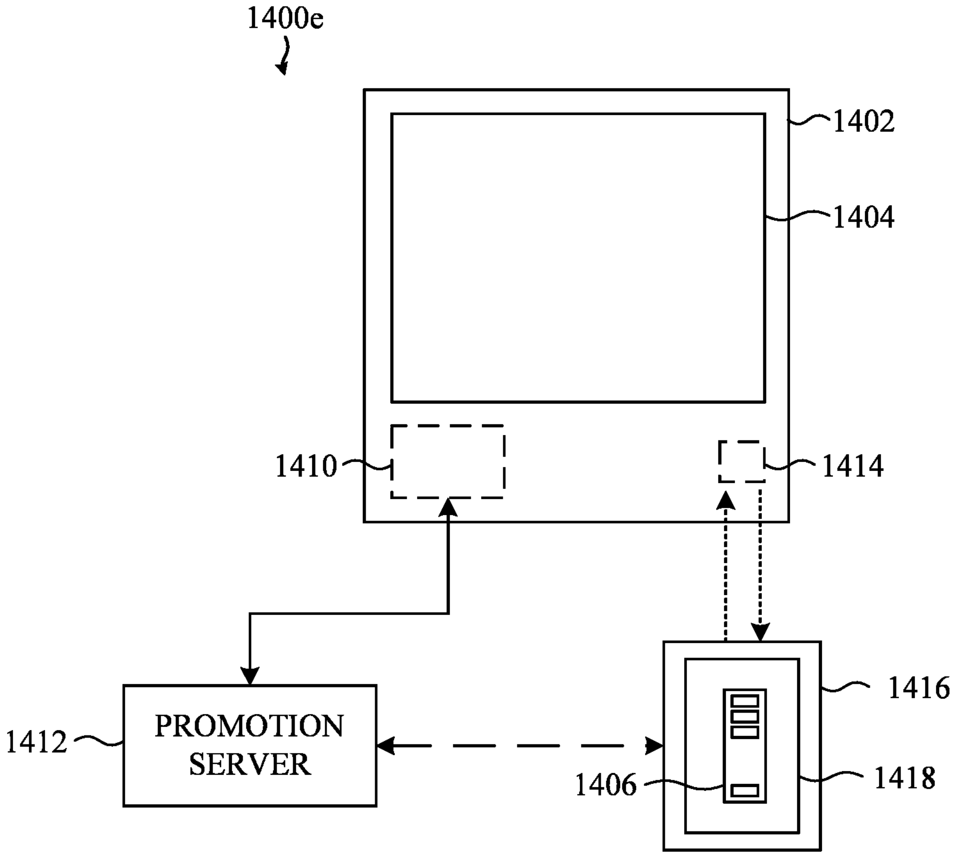
FIG. 14E is a simplified diagram of another system for associating a player account and an electronic gaming machine, such as described herein.

FIG. 14E depicts another example network architecture of a system 1400*e* such as described herein. For simplicity of description and illustration, it may be understood that the various elements described in reference to the system 1400*a* depicted in FIG. 14A are similarly numbered in the embodiment depicted in FIG. 14E; the description of these various elements is not repeated here.

The system 1400*e* includes an electronic game machine 1402, an external server (identified as the promotion server 1412), and a personal electronic device 1416. Contrasted with the embodiment depicted in FIGS. 14A-14D, the supplemental graphical user interface 1406 may not be shown on the display 1404 of the electronic game machine 1402. Instead, in this example, the supplemental graphical user interface 1406 can be shown on the display 1418 of the personal electronic device 1416.

The foregoing embodiments depicted in the figures referenced above and the various alternatives thereof and variations thereto are presented, generally, for purposes of explanation, and to facilitate an understanding of various configurations and constructions of a network architecture that facilitates communication by and between various components of a player's personal electronic device, an electronic gaming machine, and/or one or more casino servers or systems, and the various components thereof, such as described herein. More simply, these embodiments describe systems and methods for associating a player account with a particular electronic gaming machine so that a player can rapidly and easily begin interacting with an electronic gaming machine once that player arrives at that gaming machine. However, it will be apparent to one skilled in the art that some of the specific details presented herein may not be required in order to practice a particular described embodiment, or an equivalent thereof.

Thus, it is understood that the foregoing descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although the embodiment described in reference to FIGS. 14A-14E reference near-field communications and Bluetooth communications, it may be appreciated that neither of these examples are required to communicate identifying information from a personal electronic device of a player to a casino server or system in a manner that facilitates associating a particular player account (and/or funding source) with a particular electronic game machine. The communication can be one-way, or multi-way, can be across a single communication channel or multiple communications channels, and so on.

Figure 15:
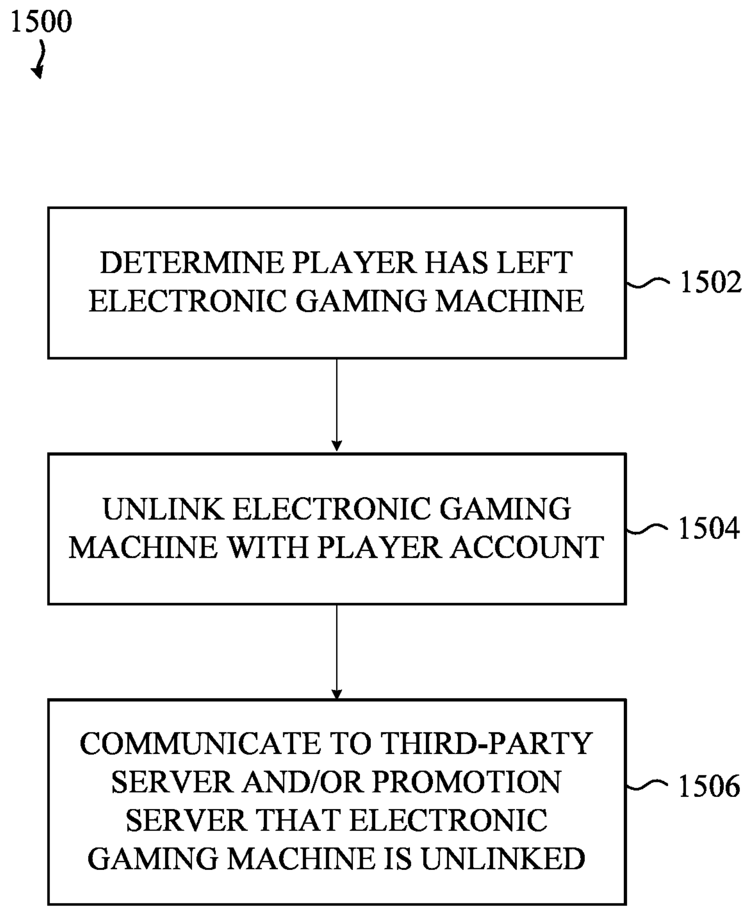
FIG. 15 is a flow chart that depicts example operations of a method of disassociating an electronic gaming machine and a player account, such as described herein.

FIG. 15 depicts example operations of a disassociating a player account and an electronic gaming machine. The method 1500 begins at operation 1502 in which an electronic game machine—and/or a personal electronic device—determines that a player has left the electronic game machine. For example, a personal electronic device can include a sensor such an inertial sensor, a gyroscope, a global positioning sensor, or an accelerometer that can be used to determine whether the personal electronic device is moving. Similarly, or in related examples, an electronic game machine can include one or more sensors configured to determine whether a player is seated and/or otherwise interacting with the machine. Example sensors include, but are not limited to: pressure sensors disposed in a seat or on the floor; proximity sensors; image sensors; acoustic sensors; and so on. Upon determining that a player has left the electronic game machine, the method 1500 continues to operation 1504 in which the electronic game machine and the players account are unlinked. In other words, operation of the electronic game machine by a second player does not utilize the first players account in any manner. Finally, at operation 1506, a third-party server and/or other casino system server can be informed that the electronic game machine and the player account are unlinked and disassociated.

Figure 16:
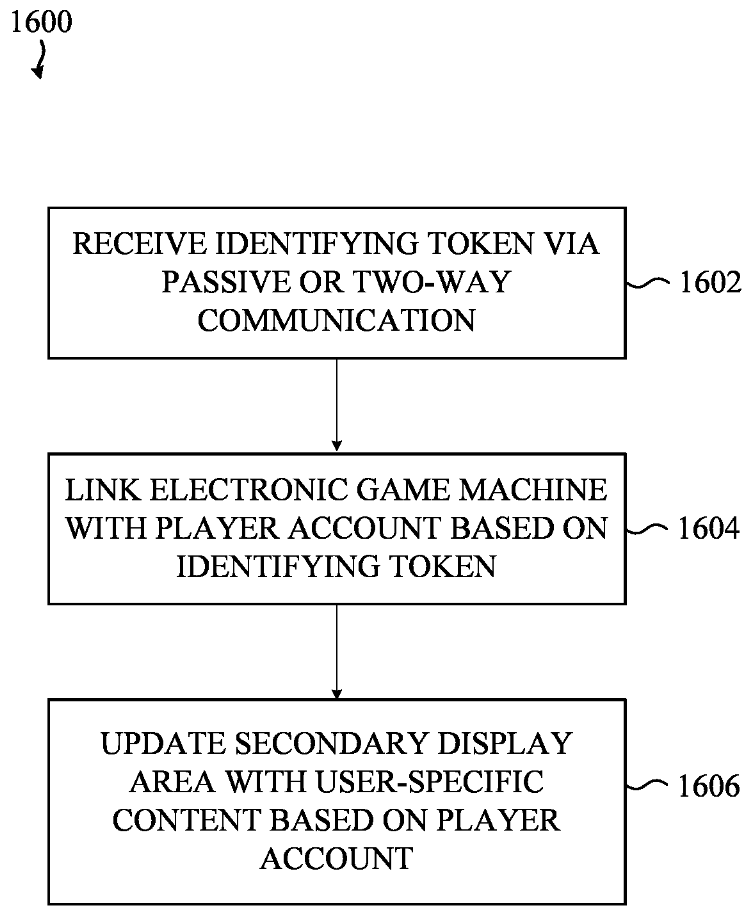
FIG. 16 is a flow chart that depicts example operations of a method of associating an electronic gaming machine and a player account, such as described herein.

FIG. 16 depicts operations of a method of updating a secondary display or supplemental display region of an electronic game machine based on a player account identified by, at least in part, a personal electronic device associated with (e.g., linked via a database) a particular player. The method 1600 begins at operation 1602 in which an identifying token is send, either via one-way or two-way communication, between a personal electronic device and an electronic game machine. As noted with respect to FIGS. 14A-14E—and other embodiments described herein—the token can be communicated from the personal electronic device to the electronic game machine, from the electronic game machine to the personal electronic device, from the personal electronic device to a third-party or external server, from the electronic game machine to a third-party or external server, or any suitable combination thereof. Next, at operation 1604, the electronic game machine is associated with a player account that is associated with the identifying token. Finally, at operation 1606, a secondary display and/or secondary display region—whether that secondary display is associated with the personal electronic device or the electronic game machine—can be updated to show player-specific information such as, but not limited to: a player name, a player account balance, a player funding source, player transaction history; player tax information; player limit information; player food or beverage preferences; and so on. The secondary display and/or region can also be configured to play a game, present a lottery ticket purchase option, present a ticket and/or tax form printing option, or any other suitable option to the player.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein—including private financial data—will preferably comply with published and industry-established privacy, data, and network security policies and practices. For example, it is understood that data and/or information obtained from remote or local data sources—only on informed consent of the subject of that data and/or information—should be accessed aggregated only for legitimate, agreed-upon, and reasonable uses.

What is claimed is:

1. A system for transacting with player accounts in a casino environment, the system comprising:
- at least one electronic gaming machine including a gaming machine processor and mobile interface device;
- a peripheral controller facilitating communications between the at least one electronic gaming machine and one or more peripherals associated with the electronic gaming machine;
- at least one internal server;
- at least one external server; and
- a dedicated processing unit, separate from the gaming machine processor, configured to:
  - secure a communication channel between the mobile interface device and a personal electronic device;
  - receive and verify identifying information from the personal electronic device;
  - receive an account balance from the personal electronic device; and
  - send an instruction to the peripheral controller associated with the electronic gaming machine to credit the electronic gaming machine with the account balance.

2. The system of claim 1, wherein the account balance relates to a bank account.

3. The system of claim 1, wherein the account balance relates to a player gaming account.

4. The system of claim 1, wherein the identifying information is verified via the at least one internal server or at least one external server.

5. The system of claim 1, wherein the account balance is received with a cryptographic signature that verifies the account balance is genuine and up-to-date.

6. The system of claim 1, wherein the peripheral controller facilitates communications between the at least one electronic gaming machine and a bill validator and printer associated with the electronic gaming machine.

7. The system of claim 1, wherein the dedicated processing unit is further configured to unlink communications between the mobile interface device and the personal electronic device based on a location of the mobile interface device.

8. The system of claim 1, wherein the peripheral controller is in communication with one or more of the at least one internal server and the at least one external server.

9. A method of funding an electronic gaming machine having a mobile interface device comprising:

securing a communication channel between the mobile interface device of the electronic gaming machine and a personal electronic device;

facilitating communications between the at least one electronic gaming machine and one or more peripherals associated with the electronic gaming machine;

utilizing a dedicated processing unit, separate from the gaming machine processor, for:

receiving and verifying identifying information from the personal electronic device;

receiving financial account information from the personal electronic device; and sending an instruction to a peripheral controller associated with the electronic gaming machine to credit the electronic gaming machine with funds from a financial account related to the financial account information.

10. The method of claim 9, wherein the financial account is a bank account.

11. The method system of claim 9, wherein the financial account is a player gaming account.

12. The method of claim 9, wherein the financial account information is received with a cryptographic signature that verifies the account balance is genuine and up-to-date.

13. The method of claim 9, wherein the peripheral controller facilitates communications between the at least one electronic gaming machine and a bill validator and printer associated with the electronic gaming machine.

14. The method of claim 9, wherein the peripheral controller is in communication with one or more of the at least one internal server and the at least one external server.

* * * * *